(12) United States Patent
Walker et al.

(10) Patent No.: US 8,992,329 B2
(45) Date of Patent: *Mar. 31, 2015

(54) METHOD AND APPARATUS FOR PLANNING AND CUSTOMIZING A GAMING EXPERIENCE

(71) Applicant: IGT, Las Vegas, NV (US)

(72) Inventors: Jay S. Walker, Ridgefield, CT (US); James A. Jorasch, New York, NY (US); Geoffrey M. Gelman, Brooklyn, NY (US); Norman C. Gilman, Glen Rock, NJ (US); Scott T. Friesen, Norwalk, CT (US); Steven M. Santisi, Ridgefield, CT (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/951,732

(22) Filed: Jul. 26, 2013

(65) Prior Publication Data

US 2013/0310158 A1 Nov. 21, 2013

Related U.S. Application Data

(63) Continuation of application No. 12/782,381, filed on May 18, 2010, now Pat. No. 8,500,562, which is a continuation of application No. 10/174,432, filed on Jun. 17, 2002, now Pat. No. 7,753,789.

(60) Provisional application No. 60/298,482, filed on Jun. 15, 2001.

(51) Int. Cl.
*A63F 13/00* (2014.01)
*G07F 17/32* (2006.01)
*G06Q 30/02* (2012.01)

(52) U.S. Cl.
CPC ............ *G07F 17/3244* (2013.01); *G06Q 30/02* (2013.01); *G07F 17/32* (2013.01)
USPC .................. 463/42; 463/16; 463/17; 463/18; 463/19; 463/20; 463/22; 463/39; 463/40; 463/41

(58) Field of Classification Search
CPC ... A63F 13/00; A63F 13/12; A63F 2300/572; A63F 9/24; G07F 17/32; G07F 17/3223; G07F 17/3232; G07F 17/3227; G07F 17/323; G07F 17/3272; G07F 17/3288; G07F 17/3244; G07F 17/3255; G07F 17/34; G07F 17/3225; G07F 17/3202; G07F 17/3276; G07F 17/329; G06Q 30/02; G06Q 50/34; G06Q 50/01; G06Q 30/0214; G06Q 30/0247; G06Q 30/06; G06Q 10/02; G06Q 30/0201; G06Q 30/0207; G06Q 30/0241; G06Q 30/0256; G06Q 30/0277; G06Q 30/08

See application file for complete search history.

(56) References Cited

U.S. PATENT DOCUMENTS

| | | | |
|---|---|---|---|
| 4,760,245 | A | 7/1988 | Fukaya |
| 5,178,390 | A | 1/1993 | Okada |
| 5,634,849 | A | 6/1997 | Abecassis |
| 5,772,509 | A | 6/1998 | Weiss |
| 6,012,983 | A | 1/2000 | Walker et al. |

(Continued)

FOREIGN PATENT DOCUMENTS

WO    WO 0125957    4/2001

OTHER PUBLICATIONS

"Revealing the Casinos Best-Kept Secrets", Atlantic City Insider, Oct. 1996, vol. 1, No. 2.

(Continued)

*Primary Examiner* — Sunit Pandya
(74) *Attorney, Agent, or Firm* — Neal, Gerber & Eisenberg LLP

(57) ABSTRACT

The invention includes a system and method for planning and customizing a gaming vacation. Initially, a central controller receives preference and configuration data from a user at a user terminal. A preparation code is then determined and associated with the configuration data. The configuration data and the associated preparation code are transmitted from the central controller to a casino server. The central controller provides feedback regarding the user's requests. The feedback may include, for example, marketing offers for the user and/or configuring a gaming device according to the configuration data associated with a preparation code received from a user at the gaming device.

17 Claims, 15 Drawing Sheets

(56) References Cited

U.S. PATENT DOCUMENTS

| | | | |
|---|---|---|---|
| 6,068,552 | A | 5/2000 | Walker et al. |
| 6,077,163 | A | 6/2000 | Walker et al. |
| 6,244,958 | B1 | 6/2001 | Acres |
| 6,306,038 | B1 | 10/2001 | Graves et al. |
| 6,350,199 | B1 | 2/2002 | Williams et al. |
| 6,374,287 | B1 | 4/2002 | Goldstein |
| 6,379,246 | B1 | 4/2002 | Dabrowski |
| 6,511,377 | B1 | 1/2003 | Weiss |
| 6,520,856 | B1 | 2/2003 | Walker et al. |
| 6,547,131 | B1 * | 4/2003 | Foodman et al. ............. 235/380 |
| 6,554,707 | B1 | 4/2003 | Sinclair et al. |
| 6,606,602 | B1 | 8/2003 | Kolis |
| 6,709,331 | B2 | 3/2004 | Berman |
| 6,997,807 | B2 | 2/2006 | Weiss |
| 7,033,276 | B2 | 4/2006 | Walker et al. |
| 7,040,987 | B2 | 5/2006 | Walker et al. |
| 7,140,964 | B2 | 11/2006 | Walker et al. |
| 2002/0002075 | A1 | 1/2002 | Rowe |
| 2002/0107072 | A1 | 8/2002 | Giobbi |
| 2002/0142825 | A1 | 10/2002 | Lark et al. |
| 2002/0142846 | A1 * | 10/2002 | Paulsen ........................ 463/43 |
| 2002/0161645 | A1 | 10/2002 | Walker et al. |

OTHER PUBLICATIONS

Website: "Boarding Pass Registration", Station Casino, (http //myboardingpass com/bypass/signup asp), download date: Apr. 20, 2001.

Website: "eTickets", Admission Control com. (http //www admissioncontrol com/acc/aboutetickets htm), download date: Apr. 20, 2001.

Website: "MyBoardingPass.com One Card Does it all in Las Vegas", Station Casino, (http //mybozrdingpass com/bypass/main asp), download date: Apr. 20, 2001.

Website: "Station Casinos Entertainment", Station Casino, )http //myboardingpass com/home/default asp?f=1), download date: Apr. 20, 2001.

Website: "Kook Kat™", IGT, (http //www igtonline com/games/new_games/kool html), download date: Apr. 23, 2001.

Website: "Silicon Gaming Hopes 'Feud' Yields Fortune", Gaming Magazine, (http: //gamingmagazine com/managearticle asp?c=290 &a=251), download date: Apr. 23, 2001.

Website: "Bob Dancer presents WinPoker", (http //conjelco com/sofrtware html), download date: Sep. 7, 2001.

Website: "Speedpass: Sign Up FREE", (http //www speedpass com/care/signup jsp), download date: Oct. 9, 2001.

Yanaites, Gary, "Wild Icons . . . The Custom Slot Machine", Wild Icons™ Version 1.0.0, (http //www yonaites com/Wild_Icons), download Date: Dec. 4, 2001.

Kahney, Leander, "IPhoto Completes Apple's Picture", Wired News, (http: //www wired com/news/print/0,1294,49552,00 html), download date: Jan. 5, 2002.

* cited by examiner

FIG. 10

| USER IDENTIFIER 1030 | TRIP IDENTIFIER 1002 | PHOTO IDENTIFIER 1004 | OUTCOME IDENTIFIER 1006 | RECORDING CRITERIA 1008 | DELIVERABLE 1010 |
|---|---|---|---|---|---|
| P111666 | T222222 | PH100000, PH100001, PH100999 | N/A | TAKE A PICTURE WHEN I WIN MORE THAN $10 | ALBUM WITH 100 PICTURES |
| P222777 | T333333 | PH200002, PH200010 | N/A | TAKE A PICTURE EVERY HOUR | EMBOSSED ALBUM WITH 300 PICTURES |
| P333888 | T444444 | PH300333 | OC123456 | TAKE A PICTURE WHEN I WIN $100 OR MORE AND OVERLAY A PICTURE OF THE SLOT SCREEN | ALBUM WITH 100 PICTURES, 5 T-SHIRTS WITH PICTURES |
| P444999 | T555555 | N/A | OC500001, OC500002, OC500003 | RECORD ALL MY OUTCOMES | SOFTWARE PROGRAM THAT REENACTS ALL OUTCOMES |

| USER IDENTIFIER 1100 | BENEFICIARY IDENTIFIER 1102 | NAME 1104 | E-MAIL 1106 | ADDRESS 1108 | BENEFIT 1110 |
|---|---|---|---|---|---|
| P555555 | B111111 | ADAM FINSKY | ADAM@AOL.COM | ANYPLACE, USA | 5% OF ANY JACKPOT ABOVE $1,000 |
| P666666 | B222222 | LAURA TANNER | LTANNER@IBM.COM | SOMEPLACE, USA | 5% OF NET WINNINGS |
| P777777 | B333333 | JACK TINSEL | TINSEL@HOME.COM | SOMEWHERE, USA | BUFFET FOR EVERY $200 GROSS WINNINGS |

| PREPARATION CODE 1200 | GAME TYPE 1202 | DENOMINATION 1204 | LANGUAGE 1206 | CURRENCY 1208 |
|---|---|---|---|---|
| C5006 | REEL SLOTS | $1.00 | ENGLISH | US DOLLAR |
| C9224 | VIDEO POKER | $0.25 | ENGLISH | US DOLLAR |
| C9331 | BLACKJACK | $5.00 | JAPANESE | YEN |

214

| NOISE LEVEL 1210 | FONT SIZE 1212 | PICTURE TITLE, PICTURE 1214 | MUSIC TITLE, MUSIC 1216 |
|---|---|---|---|
| HIGH | MEDIUM | POODLE.PDF, <PICTUREDATA> | MACARENA, <MUSICDATA> |
| MEDIUM | SMALL | GRANDSON.PDF, <PICTUREDATA> | MY WAY, <MUSICDATA> |
| LOW | LARGE | HAMSTER.PDF, <PICTUREDATA> | BEETHOVEN'S 9TH, <MUSICDATA> |

FIG. 12

| PRODUCT IDENTIFIER 1300 | DESCRIPTION 1302 | MANUFACTURER 1304 | RETAIL PRICE 1306 | EXCESS INVENTORY 1308 |
|---|---|---|---|---|
| PR888 | EIGHT-SPEED BLENDER | ANYCORP | $80.00 | 45 |
| PR999 | WASHING MACHINE | SOMECORP | $800.00 | 0 |
| PR222 | COLOR TV | BIGCORP | $200.00 | 90 |
| PR333 | 6 MONTH CABLE SERVICE | XYZ BROADCASTING | $180.00 | UNLIMITED |

FIG. 13

METHOD AND APPARATUS FOR PLANNING AND CUSTOMIZING A GAMING EXPERIENCE

PRIORITY CLAIM

This application is a continuation application of, claims the benefit of and priority to U.S. patent application Ser. No. 12/782,381, filed on May 18, 2010, which is a continuation application of, claims the benefit of and priority to U.S. patent application Ser. No. 10/174,432, filed on Jun. 17, 2002, now U.S. Pat. No. 7,753,789, which claims the benefit of and priority to U.S. Provisional Patent Application No. 60/298,482, filed on Jun. 15, 2001, the entire contents of which are each incorporated by reference herein.

FIELD

The present invention relates to methods and apparatus for planning and customizing a casino gaming and vacation experience. More specifically, the present invention relates to permitting a player, or others, to plan and customize activities and elements of playing at, and visiting a resort casino, according to the player's preferences and/or characteristics.

BACKGROUND

There are currently over 500,000 slot machines in operation that generate more than $15 billion in annual revenue for United States casinos. Most casinos generate more than half of their gaming revenues from slot machines and some individual casinos offer two or three thousand slot machines at a single location. In fact, two different casinos in Connecticut each provide over six thousand gaining devices for players.

For players, finding a machine that they like can be very difficult. For example, a player looking for a "Full Pay Jacks or Better" video poker machine might spend half an hour or more looking for one, only to find that the casino does not have one. Such a frustrated player might then be tempted to just leave to try another casino. Even upon finding a preferred game, the player may discover that there are elements of the game that he does not like (e.g. the type font is too small, or the cards are dealt too fast).

Casinos often contain hundreds of security cameras. Most footage gathered through the cameras is of a routine nature. The footage is simply stored on tape and eventually erased without ever being used. The expense associated with maintaining and operating so many cameras is significant.

Many people center entire vacations around casino visits. Many vacationers must travel significant distances to reach a casino and thus, casinos frequently offer hotel accommodations, resort facilities, restaurants, and shopping, in addition to gaming. Visitors to Las Vegas spend an average of 4.3 days in Las Vegas and make, on average, only 1.9 trips there per year. Thus, vacationers have limited time to enjoy gaming.

People may spend weeks planning a vacation, often beginning far in advance of the vacation. Planning for a vacation builds excitement and anticipation. Planning also allows people to forego logistical and other mundane considerations during the limited time when they would rather be enjoying themselves. In addition, vacationers frequently go through the trouble of carrying photography and video equipment to capture images to remember their vacation.

What is needed are systems and methods to mitigate or eliminate the problems identified above.

BRIEF DESCRIPTION OF THE DRAWINGS

FIG. 10 is a table illustrating an example data structure of an example trip documentation database 210 as depicted in FIG. 2 for use in some embodiments of the present invention.

FIG. 11 is a table illustrating an example data structure of an example gambling circle database 212 as depicted in FIG. 2 for use in some embodiments of the present invention.

FIG. 12 is a table illustrating an example data structure of an example preparation database 214 as depicted in FIG. 2 for use in some embodiments of the present invention.

FIG. 13 is a table illustrating an example data structure of an example product database 608 as depicted in FIG. 6 for use in some embodiments of the present invention.

DETAILED DESCRIPTION

Figure 1A:
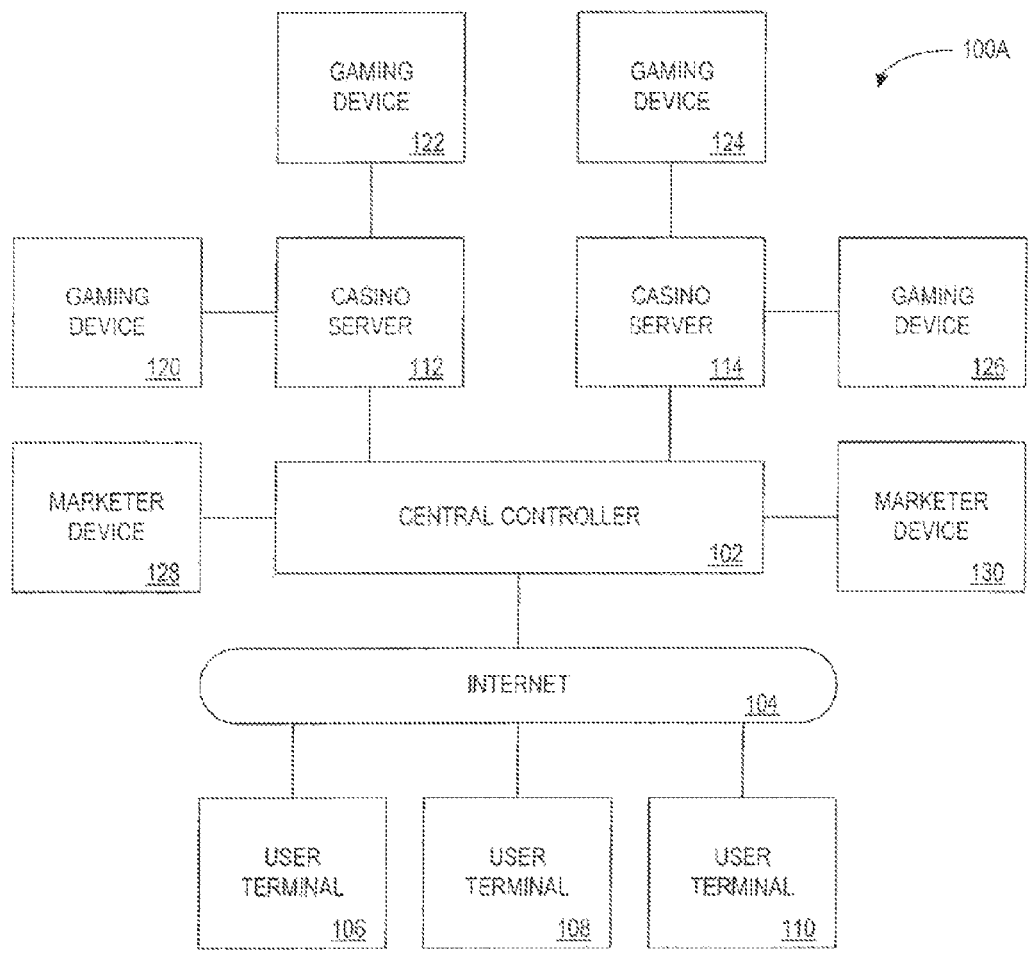
FIG. 1A is a block diagram illustrating an example system according to some embodiments of the present invention.

The disclosed invention overcomes the above and other drawbacks of the prior art by allowing a user to remotely plan various aspects of a gambling vacation. In some embodiments of the present invention, a user may customize the look and feel of a gaming device prior to visiting the casino. He may also choose a preferred game, a preferred pay table, preferred odds, win percentages, and so on. In some embodiments a user may remotely select a betting system that limits his total number of wagers, that allocates winnings to predetermined accounts, that increases and decreases his rate of handle pulls based on gambling results, and so on. Remotely selecting a betting system may allow a user to follow a predetermined gaining strategy, avoiding tempting deviations while at the slot machine.

In some embodiments of the invention, a user may involve friends, relatives, and other acquaintances in his gambling vacation. In some embodiments, a user may identify a group of people who are to share in his winnings. The user may then embark on his vacation with the good wishes of all those who will benefit from his results. In some embodiments, a user may remotely submit email addresses of friends so that the email addresses are readily available for him at his destination casino. The user may then email his friends as he wins. In some embodiments, a user may also remotely set up an account on a casino server or a particular slot machine, receive an email address for his account, and then let friends and relatives know where they may contact him.

In some embodiments, a user may remotely set up credit lines so that he need not carry large amounts of cash to a casino or have to process a credit application while on vacation. In some embodiments a user may be presented with and accept a marketing offer (and thus agree to fulfill any associated obligations) in exchange for casino resort discounts, coupons, complimentary ("comp") program points, free gambling credits, and/or insurance against gambling losses. In some embodiments a user may arrange to receive marketing offers at a casino. The user may then choose whether or not to accept the marketing offers depending on how much he has won or lost at the casino.

In some embodiments a user may remotely configure the user interface to a gaming device. When the user then appears at a gaming device, he may benefit from the use of areas on the touch screen that allow him to make his favorite bet, order his favorite drink, accept an offer from a marketer, and so on.

In some embodiments a user may remotely designate prizes or comps he desires. A user may remotely submit his intended travel plans, including how long he is to stay at a destination, how much he is to gamble, where he is to eat, and so on. The user may then receive marketing offers based on his intentions.

In some embodiments a user may remotely select a method of documentation for a trip to a casino. He may ask a casino to use its security cameras to take pictures of him when he has won large prizes. He may ask that the casino save the results of particular spins on the slot machine, for later reenactment. The user may then be motivated to spend most of his time at that casino if the user wants his vacation documented in a consistent manner.

In some embodiments of the present invention, a central controller communicates with multiple user devices, multiple casino servers, and multiple marketer devices. The casino servers, in turn, are in communication with multiple casino devices, including gaming devices. Prior to embarking on a gaming vacation, a user may log onto a Web site hosted by the central controller. On the Web site, the user may prepare for his vacation by inputting a preferred gaming device configuration, choosing a betting system, selecting a group of friends with which to share winnings, and by performing or using other aspects of the invention mentioned above. The central controller may then associate all the data defining the user's preparations with a preparation code or a user identifier such as the user's name or a player, tracking card number, and store the user's preparation data in, for example, a preparation database and the user identifier in a user database. When the user subsequently visits a casino, the user may submit his user identifier and/or preparation code to any casino device. The device may then contact the central controller via the casino server and receive the user's preparation data. The casino device may then modify its operations in accordance with the preparation data. For example, the casino device may execute software for particular game the user has chosen, or may spin the reels at a speed the user has chosen.

Also, once a user has submitted his user identifier to a first casino device, other casino devices may act in accordance with the user's preparation data. For example, if a user has asked that pictures of him be taken when he wins any prize of $1000 or more, a security camera may focus on the user when he wins any such prize.

In some embodiments of the invention, the central controller and the casino server are one and the same. In such a case, the combined central controller/server may be in communication with casino devices at multiple casinos, or, in some embodiments, may be in communication with casino devices at only a single casino.

According to some embodiments of the present invention, a gaming device may be customized by a player over the Internet. By logging on to a central controller, the player may be provided with a menu of game types and a series of potential customization options. After providing customization data, the player may be given a customization code that can be entered into any slot machine to reconfigure it with the stored customizations. For example, a user may log on to the Internet via a personal computer and access a casino Web site for customizing slot machines. The user may select from among several game types (e.g. deuces-wild, jacks or better, video reel, three reel, five reel, video poker, blackjack, etc.) and proceed to configure the game to his liking. For example, the user may set a default game denomination, a game starting point, rules for making automatic play decisions, game rules, a color scheme, a level of help, a bonus frequency, a bonus duration, a speed of reel spin, a font size and/or style, a currency type, a sound type, a sound level, a language, a currency, a payout structure, a payout amount, a payout option, a team option, a comp format, a jackpot probability, etc. After completing the customization, the user may be provided with a customization code. When the user arrives at a casino and sits down at a slot machine, he enters his customization code and the game reconfigures itself to the user's previously provided customizations.

In some embodiments of the disclosed, invention, information about a user may be used to provide targeted advertising and/or targeted marketing offers to the user. For example, a user may log on to a central controller (i.e. the customization Web site) and answer a series of questions about himself. For example, he might identify his age, gender, whether or not he owns a home, the types of magazines he buys, whether he has any children, whether he has any stock investments, his blood pressure and cholesterol levels, his education level, the identity of his long distance phone carrier, etc. The answers to these questions may be stored along with an associated customization code and transmitted to the casino server. When the player arrives at a casino and sits down at a gaming device to play, he enters his customization code, which is then transmitted to the casino server. During the gambling session, if it is determined that a marketing offer should be provided to the player, then the marketing answers are retrieved and used to better target the marketing offer. An offer to switch long distance service from AT&T® to MCI®, for example, might be skipped in favor of another offer if the player is already an MCI® customer.

In some embodiments, rather than receiving customization data from the player, the casino stores customization information about the player. For example, if the player is a frequent gambler, the casino might activate a comp payout percentage of two percent (2%) instead of the more typical one percent (1%). In some embodiments, instead of logging on to the central controller, the player may log directly into a casino server or a slot machine. The connection might be through the Internet or via a direct dial/WAN connection. Customization data may be provided as described above. In this embodiment, the player might be able to retrieve information from the casino about his play. The player may provide his player tracking identifier (and possibly a PIN code for security) to gain access to his account. The player may also check to see how much he has won for IRS tax reporting purposes, for example.

With these and other advantages and features of the invention that will become hereinafter apparent, the nature of the invention may be more clearly understood by reference to the following detailed description of the invention, the appended claims and to the several drawings included herein.

In the following description, reference is made to the accompanying drawings that form a part hereof, and in which is shown, by way of illustration, specific embodiments in which the invention may be practiced. These embodiments are described in sufficient detail to enable those skilled in the art to practice the invention, and it is to be understood that other embodiments may be utilized and that structural, logical, software, and electrical changes may be made without departing from the scope of the present invention. The following description is, therefore, not to be taken in a limited sense, and the scope of the present invention is defined by the appended claims.

Applicants have recognized that a need exists for systems and methods that enable users to quickly and easily locate suitable gaming devices 120, 122, 124, 126 without having to hunt through thousands of other gaming devices. One particular benefit to users of embodiments of the present invention is that users are able to cause a gaming device 120 to instantly conform to their individual player preferences upon presentation of a customization or preparation code. The players do not need to waste time wading through an elaborate maze of configuration options at the casino instead of actually using time to play the games. A second benefit to the user is that marketing offers presented via a gaming device 120 may be much more targeted and controlled which results in less time wasted by the user having to reject offers that are not appropriate or interesting. Further, using the present invention, a user can greatly extend the excitement of a gambling vacation. The user has the opportunity to build anticipation prior to the vacation by planning numerous aspects before hand. He can test various gaming device configurations to find the one that's just right. He can get his friends involved, by signing them up to win if he wins. He can arrange for tokens of good luck or sentimental value (e.g. pictures of pets) to be with him at the gaming device. The user can also extend the excitement of the vacation on the other end by reviewing a scrap book and other mementos of his trip when it is documented by the casino. The user has the opportunity to optimize his playing conditions and other aspects of his vacation, without wasting precious time during the vacation. For example, a user can determine a good configuration for a gaining device in advance, and also determine where in Las Vegas to find a gaming device capable of that configuration.

Benefits of the present invention for the casino include: (1) players no longer leave the casino if they do not find their preferred machines; (2) players play longer when the machine is configured for their needs; (3) players accept more marketing offers when they are better targeted; (4) a casino that allows a user to plan and optimize his experience at that casino is very likely to obtain a large share of the user's business; (5) when a casino documents a user's vacation, the user is more likely to remain at that casino so as to have his vacation documented in a consistent manner; (6) when marketers fund portions of a user's gambling activities, the user tends to gamble more, providing greater profits for the casino; and (7) a user who documents a vacation may show the documentation to friends, creating new customers for the casino.

Benefits to gaming device manufacturers include (1) acquiring player customization information is valuable and useful in developing new gaming devices and (2) manufactures will sell more customization software for gaming devices. A benefit of the invention for a marketer is that when a user submits information about himself, his intentions, his desires, and his worries, a marketer can better target offers to the user. For example if the user says he is a Mercedes owner, a marketer can attempt to sell upscale items to the user. If the user is worried about losing more than $40, the marketer can offer to offset user losses in excess of $40 in return for the user's business. The present invention allows a player to select the specific types of offers he is willing to consider from marketers, making the marketer's job much easier.

A. TERMS

Throughout the description that follows and unless otherwise specified, the following terms may include the meanings provided, in this section. These terms and illustrative meanings are provided to clarify the language selected to describe embodiments of the invention both in the specification and in the appended claims.

The terms "products," "goods," "merchandise," and "services" shall be synonymous and may refer to anything licensed, leased, sold, available for sale, available for lease, available for licensing, and/or offered or presented for sale, lease, or licensing including packages of products, subscriptions to products, contracts, information, services, and intangibles.

The term "merchant" may refer to an entity who may offer to sell, lease, and/or license one or more products to a consumer (for the consumer or on behalf of another) or to other merchants. For example, merchants may include sales channels, individuals, companies, manufacturers, distributors, direct sellers, re-sellers, and/or retailers. Merchants may transact out of buildings including stores, outlets, malls and warehouses, and/or they may transact via any number of additional methods including mail order catalogs, vending machines, online Web sites, and/or via telephone marketing. Note that a producer or manufacturer may choose not to sell to customers directly and in such a case, a retailer may serve as the manufacture's or producer's sales channel.

The terms "player" and "user" shall be synonymous and may refer to any person or entity that operates a user device, a gaming device, and/or a user terminal.

The term "gaming device" may refer to any electrical, mechanical, electro-mechanical and/or other device that may accept a wager, may follow a process to generate an outcome, and may pay winnings based on the outcome. The outcome may be randomly generated, as with a slot machine; may be generated through a combination of randomness and user skill, as with video poker; or may be generated entirely through user skill. A gaming device may include any gaming machine and/or system, including slot machines, video poker machines, video bingo machines, video roulette machines, video keno machines, video blackjack machines, arcade games, video games, video lottery terminals, online gaming systems, sports betting machines, game consoles, personal computers logged into online gaming sites, etc. Gaming devices may or may not be owned and/or maintained by a casino and/or may or may not exist within a casino location.

The term "casino device" may refer to any electrical, mechanical, electro-mechanical and/or other device meant to be used or interact with people at a casino. These may include for example, user devices, I/O devices, gaming devices, and/or personal computers located at hotel registration desks, chip cashing desks, casino pits, and so on. Casino devices may also include such things as security cameras, elevators, music systems, guest room televisions, telephones, beds, mini-bars, door locks chairs, point-of-sale terminals, etc.

The term "casino" may refer to the owner of gaming devices, owners agents, and/or any entity who may profit from players' use of the gaming devices.

The term "casino location" may refer to the physical geographic site, complex, or building where gaming devices owned and/or operated by a casino are located. In the case of an online casino, casino location may refer to the address (e.g. the uniform resource locator (URL)) of the online casino's Web site or facility.

The term "handle pull" may refer to a single play at a gaming device. In some embodiments, a handle pull may refer to a single complete game (or hand) or in other embodiments, the term may refer to a play related to a single wager. For example, in video blackjack, a user might play a single game in which he splits a pair of sevens, requiring an additional wager. This single game may be considered to include either one or two handle pulls.

The terms "central controller" and "controller" shall be synonymous and may refer to any device that may communicate with one or more casino servers, one or more gaming devices, one or more third-party service provider servers, one or more remote controllers, one or more player devices, and/or other network nodes, and may be capable of relaying communications to and from each.

The term "user terminal" and "remote controller" shall be synonymous and may refer to any device that may communicate with one or more casino servers, one or more gaming devices, one or more third-party service provider servers, one or more player devices, and/or other network nodes. User terminals may, for example, include personal computers, laptop computers, handheld computers, telephones, kiosks, automated teller machines, gaming devices, game consoles, and/or vending machines. They may be used to access configuration selection programs, to execute such programs, and/or to configure gaming devices. They may include facilities to support secure communications using encryption or the like.

The terms "player device" and "user device" shall be synonymous and may refer to any device owned or used by a user or consumer capable of accessing and/or displaying online and/or offline content. Player devices may communicate with one or more casino servers, one or more gaming devices, one or more third-party service provider servers, one or more user terminals, and/or other network nodes. In some embodiments, player devices may, for example, include gaming devices, personal computers, personal digital assistants, point-of-sale terminals, point of display terminals, kiosks, telephones, cellular phones, automated teller machines (ATMs), pagers, and combinations of such devices. They may be used to access configuration or preference selection programs, to execute such programs, and/or to configure gaming devices.

The term "input device" may refer to a device that is used to receive an input. An input device may communicate with or be part of another device (e.g. a point of sale terminal, a point of display terminal, a user terminal, a server, a player device, a gaming device, a controller, etc.). Some examples of input devices include: a bar-code scanner, a magnetic stripe reader, a computer keyboard, a point-of-sale terminal keypad, a touch-screen, a microphone, an infrared sensor, a sonic ranger, a computer port, a video camera, a motion detector, a digital camera, a network card, a universal serial bus (USB) port, a GPS receiver, a radio frequency identification (RFID) receiver, a RF receiver, a thermometer, a pressure sensor, and a weight scale.

The term "output device" may refer to a device that is used to output information. An output device may communicate with or be part of another device (e.g. a gaming device, a point of sale terminal, a point of display terminal, a player device, a merchant device, a controller, etc.). Possible output devices include: a cathode ray tube (CRT) monitor, liquid crystal display (LCD) screen, light emitting diode (LED) screen, a printer, an audio speaker, an infra-red transmitter, a radio transmitter.

The term "I/O device" may refer to any combination of input and/or output devices.

The term "frequent shopper card" may refer to a device that may be capable of storing information about a consumer who is a shopper. This information may include identifying information and shopping history information. The frequent shopper card may be machine readable, for example, by a POS terminal. According to some embodiments of the present invention, a frequent shopper card may store gaining device customized configuration information.

The term "player tracking card" may refer to a device that may be capable of storing information about a consumer who is a casino player. Typically player tracking cards may be accessed by gaming devices and magnetic card readers operated by casino staff. The information stored on the player tracking card may include identifying information, as well as financial information, such as a number of gambling credits remaining. The card may be machine readable, for example, by a gaming device. According to some embodiments of the present invention, a player tracking card may store gaming device customized configuration information.

The term "ATM card" may refer to a device that may be capable of storing information about a consumer who is a bank customer. This information may include identifying information and bank account information. The ATM card may be machine readable, for example, by an automated teller machine. According to some embodiments of the present invention, an ATM card may store gaming device customized configuration information.

The term "configuration" may refer to one or more feature values, preferences, or selections for the operation of a gaming or other device.

The term "customized configuration" may refer to a configuration designed or chosen by a player for his own use.

The term "configuration data" may refer to a customized configuration and/or information that a device may use to configure itself or another device. In some embodiments, configuration data may refer to information about a player that may be useful to casinos or third-parties who may attempt to configure a gaming device to some degree for the player. For example, a marketing company may use the information about a player to create a targeted advertisement that may be configured to be presented to the player via the gaming device.

The term "preparation data" may refer to any data received from, or related to, a user that is descriptive of characteristics of the user's desires, aspirations, intentions, expectations, preferences, and/or plans related to his gambling experience or gambling vacation. In some embodiments, preparation data may include information (and/or documentation) useful in (and/or required to) fulfill the user's desires, aspirations, intentions, expectations, and/or plans. For example, preparation data may include work product, such as a completed survey form, that the user has produced in exchange for a coupon from a marketing research firm, wherein the coupon is for a free meal at the casino restaurant at which the user was planning to eat. In some embodiments, preparation data may also include configuration data.

The terms "customization code" and "preparation code" shall be synonymous and may refer to a code used to identify a set of stored preparation data (which may include user preferences and other configuration data). In some embodiments, a customization code may be the player's player tracking card number or other identification number. In some embodiments, a customization code may include actual preparation data and/or an address of (or a pointer to) preparation data. A pointer to preparation data may be used, for example, to indicate where, within a casino device's read-only memory, predefined preparation data for that casino device may be found.

The term "feature" may refer to an individual aspect of the operation of a gaining (or other) device, or a user's experience with the gaming (or other) device. Individual features might include the reel speed, the payout percentage, or the contrast of the video screen on a slot machine. A set of features taken together represents a configuration for a gaming device.

The terms "gambling insurance policy," "gambling insurance," and "gambling insurance contract" shall be synonymous and may refer to an agreement between a user and a casino, and/or between a user and an insurer, with the following typical provisions: (1) the user pays the insurer a fixed amount up front; (2) the user must make a predetermined number of handle pulls, no more and no less; (3) the user need not pay any additional money after purchasing the gambling insurance contract; (4) the user keeps any net winnings after all handle pulls have been completed; (5) if the user has a net loss after the handle pulls have been completed, then the loss amount is paid to the casino by the insurer and the player is refunded the loss amount. There are many possible variants of these provisions and additional provisions are possible. A gambling insurance contract may insure a user against excessive losses, and may give the user more handle pulls than would otherwise be possible for the price of the gambling insurance contract. Also, since there may be no additional user decisions required after the user has purchased the gambling insurance contract, the user need not be present for the execution of the contract.

The term "contract" may include a gambling insurance contract and a gaming contract.

The term "gambling circle" may refer to a group of people, at least one of whom gambles, and whose members receive benefits based on the results of the gambler. For example, a user may go to Las Vegas, while several friends remain in the user's home town. The user may sign up the friends to be part of the user's gambling circle. In some embodiments, the friends may then receive a percentage of any jackpot the user wins.

B. SYSTEM

Figure 2:
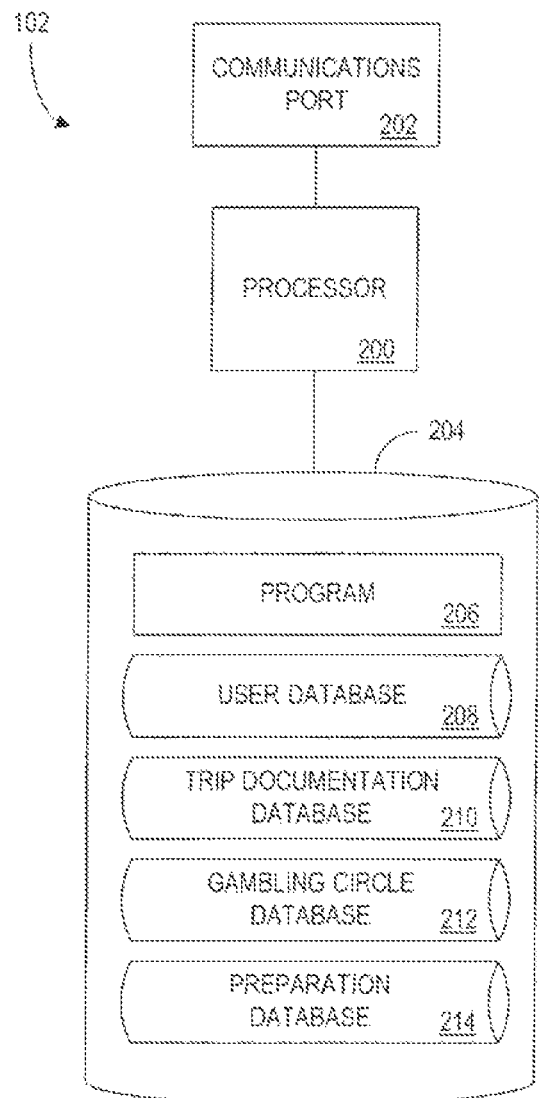
FIG. 2 is a block diagram illustrating an example of a central controller 102 as depicted in FIGS. 1A and 1B according to some embodiments of the present invention.
Figure 3:
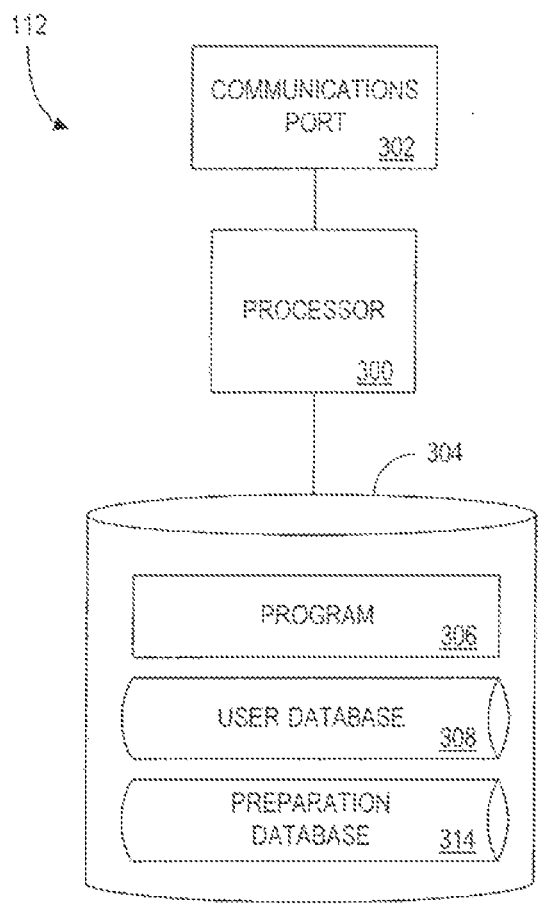
FIG. 3 is a block diagram illustrating an example of a casino server 112 as depicted in FIGS. 1A and 1B according to some embodiments of the present invention.
Figure 4:
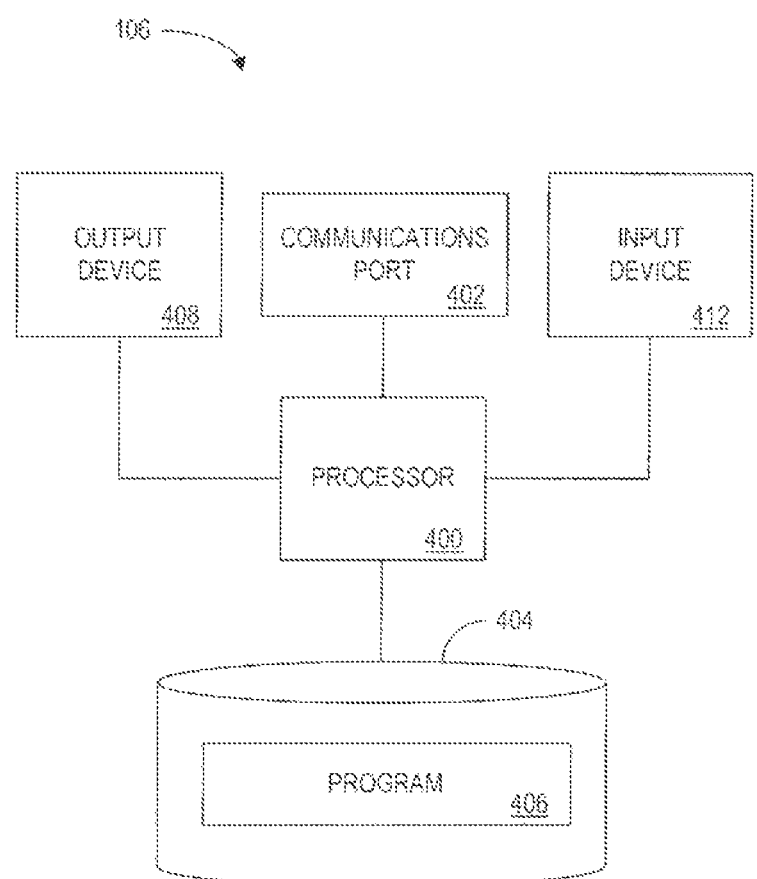
FIG. 4 is a block diagram illustrating an example of a user terminal 106 as depicted in FIGS. 1A and 1B according to some embodiments of the present invention.
Figure 5:
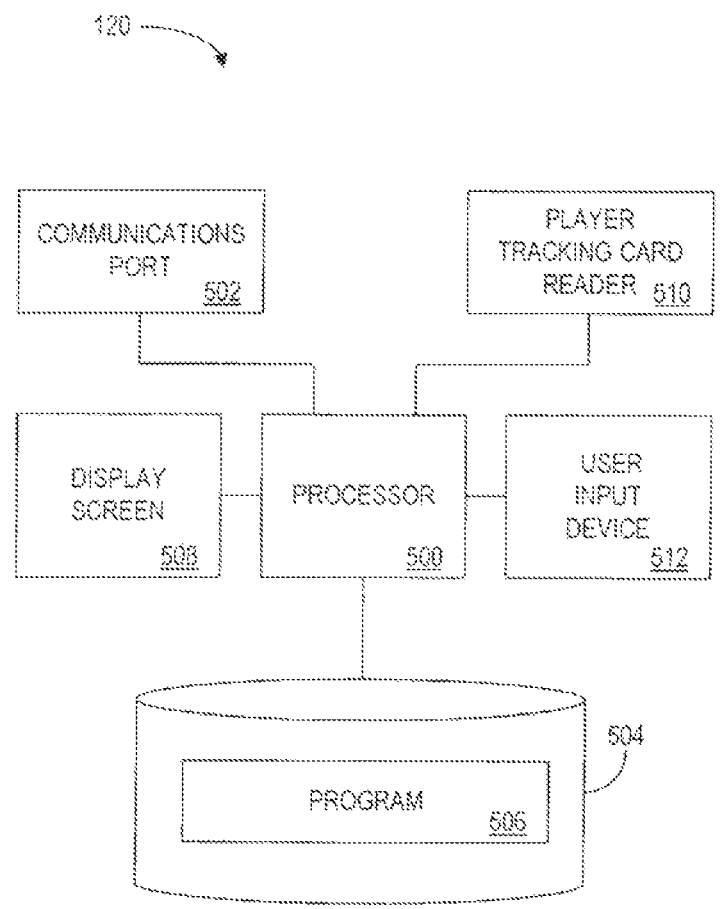
FIG. 5 is a block diagram illustrating an example of a gaming device 120 as depicted in FIGS. 1A and 1B according to some embodiments of the present invention.
Figure 6:
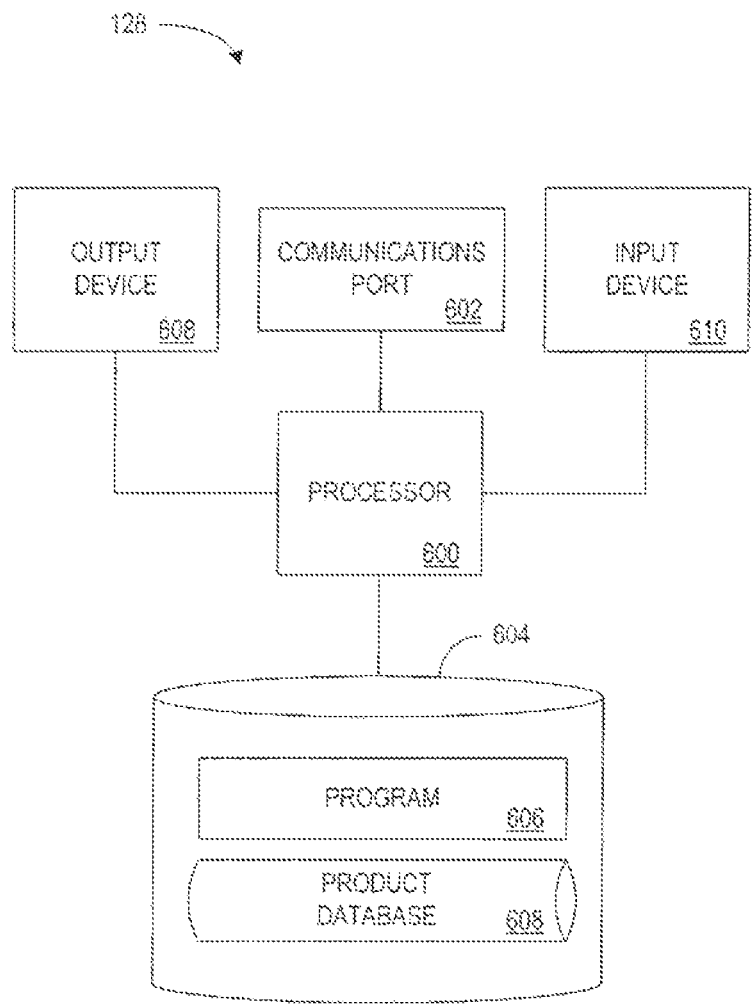
FIG. 6 is a block diagram illustrating an example of a marketer device 128 as depicted in FIGS. 1A and 1B according to some embodiments of the present invention.

An example embodiment of the system 100A of the present invention is depicted in FIG. 1A. The system 100A according to some embodiments of the present invention may include a central controller 102 (an example of which is depicted in FIG. 2) in one or two-way communication with one or more casino servers 112, 114 (an example of which is depicted in FIG. 3); one or more user terminals 106, 108, 110 (an example of which is depicted in FIG. 4); and/or one or more marketer devices 128, 130 (an example of which is depicted in FIG. 6) via a network, for example, the Internet 104 or via another communications link. Casino servers 112, 114, in turn, are each in communication with one or more gaming devices 120, 122, 124, 126 (an example of which is depicted in FIG. 5). Although not pictured, other casino devices besides gaming devices 120, 122, 124, 126 may be connected to the casino servers 112, 114 and in communication with (and/or controllable by) the central controller 102. The devices depicted as being connected directly together in FIG. 1A may alternatively be connected via a network, for example, a local area network, the Internet 104, and/or via another communications link.

In operation, the central controller 102 may function under the control of a casino, a merchant, or other entity that may also control use of the gaming devices 120, 122, 124, 126. For example, the central controller 102 may be a server in a merchant's network. In some embodiments, the central controller 102 and the casino servers 112, 114 may be one and the same.

Figure 1B:
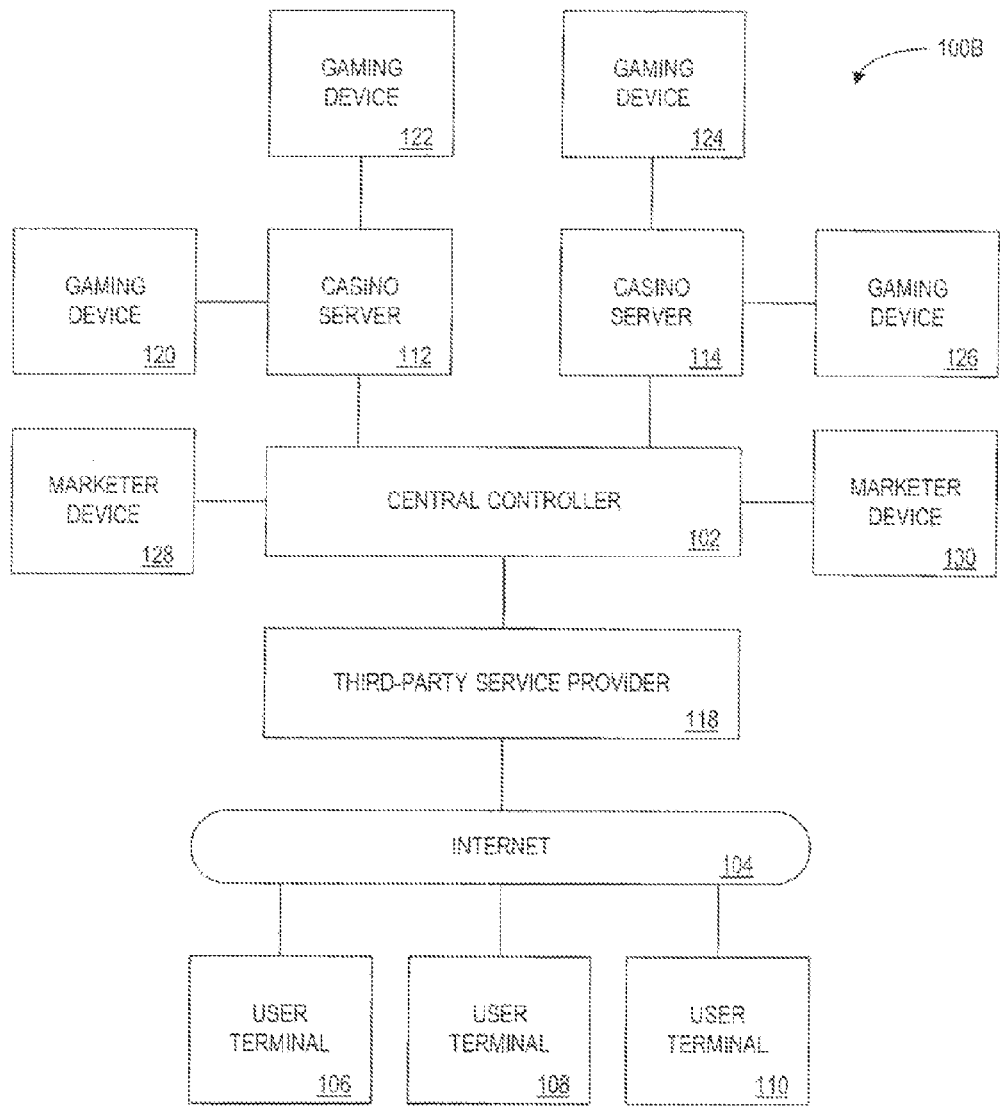
FIG. 1B is a block diagram illustrating an alternative example system according to some embodiments of the present invention.

Referring to FIG. 1B, an alternative system 100B according to some other embodiments of the present invention further includes one or more third-party service provider servers 118. A third-party service provider server 118 may also be in one or two-way communication with the central controller 102. However, as shown in the embodiment depicted in FIG. 1B, the third-party service provider server 118 may be disposed between the central controller 102 and the user terminals 106, 108, 110. Alternatively, the third-party service provider server 118 may be disposed between the central controller 102 and the casino servers 112, 114.

The primary difference between the two alternative embodiments depicted in FIGS. 1A and 1B is that the embodiment of FIG. 1B includes the third-party service provider server 118 which may be operable by an entity distinct and/or physically remote from the entity operating the central controller 102. In operation, the third-party service provider server 118 may perform the methods of the present invention by sending signals to the central controller 102 to be relayed to the user terminals 106, 108, 110. For example, a marketing company may operate a third-party service provider server 118 that communicates with a slot machine manufacturing company server (functioning as a central controller 102) to provide players with marketing offers based on player information gathered via user terminals 106, 108, 110, marketer devices 128, 130, and/or gaming devices 120, 122, 124, 126. In the embodiment of FIG. 1A, the functions of the third-party service provider server 118 may be consolidated into the central controller 102.

An additional difference between these two embodiments relates to the physical topology of the systems 100A and 100B. In both of the depicted embodiments, each node may securely communicate with every other node in the system 100A, 100B via, for example, a virtual private network (VPN). Thus, all nodes may be logically connected. However, the embodiment depicted in FIG. 1B allows the third-party service provider server 118 to optionally serve as a single gateway between the nodes that will typically be under the control of one or more casinos (and players within the casinos' location) and the other nodes in the system 100B, i.e. nodes that may be operated by players outside of the casinos' location. In some embodiments of the present invention, the centralization, security, and control that naturally results from this topology is useful in monitoring players' use of the system to make such determinations as, for example, which preparations are the most popular or how many users are currently actively planning or preparing for a visit to a casino. Further, in some embodiments, marketer devices 128, 130 may be connected to the system 100B via the Internet 104 instead of directly to the central controller 102. This would physically locate them on the "public" side of the third-party service provider server 118 gateway and allow, for example, a much more secure network on the "private" side of the third-party service provider server 118 gateway.

In some embodiments, the casino servers 112, 114 may each be controlled by different casinos. The central controller 102 may be operated by an entity that uses the present invention to, for example, deliver players to the different casinos. If there is a third-party service provider server 118, it may be operated by an unrelated entity that merely permits the operators of the central controller 102 to have access to players who are operating the user terminals 106, 108, 110 or the gaming devices 120, 122, 124, 126. Thus, in such an example embodiment, the system of the present invention may involve multiple casinos (operating casino servers 112, 114, 116), a merchant such as a customer acquisition service agent (operating the central controller 102), merchant clients of the customer acquisition service agent (operating the marketer devices 128, 130), third-party network operators (operating third-party service provider servers 118), and users (operating user terminals 106, 108, 110 and gaming devices 120, 122, 124, 126). In alternative embodiments, a casino may operate a combined central controller/casino server directly and the system may only involve a casino and users.

In both embodiments pictured in FIGS. 1A and 1B, communication between the central controller 102, the casino servers 112, 114, the user terminals 106, 108, 110, the gaming devices 120, 122, 124, 126, marketer devices 128, 130, and/or the third-party service provider server 118, may be direct and/or via a network such as the Internet 104.

Referring to both FIGS. 1A and 1B, each of the central controller 102, (the third-party service provider server 118 of FIG. 1B), the casino servers 112, 114, gaming devices 120, 122, 124, 126, the marketer devices 128, 130, and the user terminals 106, 108, 110 may comprise, for example, computers, such as those based on the Intel® Pentium® processor, that are adapted to communicate with each other. Any number of third-party service provider servers 118, casino servers 112, 114, 116, gaming devices 120, 122, 124, 126, the marketer devices 128, 130, and/or user terminals 106, 108, 110 may be in communication with the central controller 102. In addition, the user terminals 106, 108, 110 may be in direct or indirect, one or two-way communication with the casino servers 112, 114, the marketer devices 128, 130, and/or the gaming devices 120, 122, 124, 126. The central controller 102, the third-party service provider server 118, the casino servers 112, 114, gaming devices 120, 122, 124, 126, the marketer devices 128, 130, and/or the user terminals 106, 108, 110 may each be physically proximate to each other or geographically remote from each other. The central controller 102, the third-party service provider server 118, the casino servers 112, 114, gaming devices 120, 122, 124, 126, the marketer devices 128, 130, and/or the user terminals 106, 108, 110 may each include input devices 202, 302, 402, 412, 502, 510, 512, 602, 610, 700, 800 and output devices 202, 302, 402, 408, 502, 508, 602, 608, 700, 800.

As indicated above, communication between the central controller 102, the third-party service provider server 118, the casino servers 112, 114, gaming devices 120, 122, 124, 126, the marketer devices 128, 130, and/or the user terminals 106, 108, 110 may be direct or indirect, such as over an Internet Protocol (IP) network such as the Internet 104, an intranet, or an extranet through a Web site maintained by the central controller 102 (and/or the third-party service provider server 118) on a remote server or over an online data network including commercial on-line service providers, bulletin board systems, routers, gateways, and the like. In some embodiments, the nodes may communicate with each other over local area networks including Ethernet, Token Ring, and the like, radio frequency communications, infrared communications, microwave communications, cable television systems, satellite links, Wide Area Networks (WAN), Asynchronous Transfer Mode (ATM) networks, Public Switched Telephone Network (PSTN), other wireless networks, and the like.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet 104 may not transmit data to the other device for weeks at a time.

The central controller 102 (and/or the third-party service provider server 118) may function as a "Web server" that presents and/or generates Web pages which are documents stored on Internet-connected computers accessible via the World Wide Web using protocols such as, e.g., the hyper-text transfer protocol ("HTTP"). Such documents typically include one or more hyper-text markup language ("HTML") files, associated graphics, and script files. A Web server allows communication with the central controller 102 in a manner known in the art. The gaming devices 120, 122, 124, 126 and the user terminals 106, 108, 110 may use a Web browser, such as NAVIGATOR® published by NETSCAPE® for accessing HTML forms generated or maintained by or on behalf of the central controller 102 and/or the third-party service provider server 118.

As indicated above, any or all of the central controller 102, the third-party service provider server 118, the casino servers 112, 114, the gaming devices 120, 122, 124, 126, the marketer devices 128, 130, and/or the user terminals 106, 108, 110 may include or be part of, e.g., processor based cash registers, telephones, interactive voice response (IVR) systems such as the ML400-IVR designed by MISSING LINK INTERACTIVE VOICE RESPONSE SYSTEMS, cellular/wireless phones, vending machines, pagers, gaming devices including slot machines, personal computers, portable types of computers, such as a laptop computer, a wearable computer, a palmtop computer, a hand-held computer, a smart card, and/or a Personal Digital Assistant ("PDA"). Further details of the central controller 102, the third-party service provider server 118, the casino servers 112, 114, gaming devices 120, 122, 124, 126, the marketer devices 128, 130, and the user terminals 106, 108, 110 are provided below with respect to FIGS. 2 through 8.

As indicated above, in some embodiments of the invention, the central controller 102 (and/or the third-party service provider server 118) may include casino servers 112, 114, and/or user terminals 106, 108, 110. Further, the central controller 102 may communicate with gaming devices 120, 122, 124, 126 and players via gaming devices 120, 122, 124, 126 directly instead of through the casino servers 112, 114. In addition, the central controller 102 may communicate with users directly instead of through the user terminals 106, 108, 110 or gaming devices 120, 122, 124, 126. Although not pictured, the central controller 102, the third-party service provider server 118, the casino servers 112, 114, gaming devices 120, 122, 124, 126, the marketer devices 128, 130, and/or the user terminals 106, 108, 110 may also be in communication with one or more consumer and/or merchant credit institutions to effect transactions and may do so directly or via a secure financial network such as the Fedwire network maintained by the United States Federal Reserve System, the Automated Clearing House (ACH) Network, the Clearing House Interbank Payments System (CHIPS), or the like.

In operation, the casino servers 112, 114 and/or the user terminals 106, 108, 110 may exchange information about the player and the player's preparation data via the central controller 102. In embodiments with a third-party service provider server 118, the casino servers 112, 114, and/or the user terminals 106, 108, 110 and/or the gaming devices 120, 122, 124, 126 may exchange information about the player via the third-party service provider server 118. The casino servers 112, 114 may for example, provide information related to casino features or other information to the central controller 102 (and/or the third-party service provider server 118). The user terminals 106, 108, 110 may provide user preparation data to the central controller 102 (and/or the third-party service provider server 118). The central controller 102 (and/or the third-party service provider server 118) may provide information about players and their preparation data to the casino servers 112, 114 and also preparation codes to the user terminals 106, 108, 110 for later use by players at the gaining devices 120, 122, 124, 126 in the casino location. In some embodiments, upon receiving a preparation code from a gaming device 120 or other casino device, a casino server 112 may communicate instructions to the gaming device 120 to configure itself according to a stored configuration associated with the preparation code.

C. DEVICES

FIG. 2 is a block diagram illustrating details of an example of the central controller 102 of FIGS. 1A and 1B (and/or an example of a third-party service provider server 118 of FIG. 1B). The central controller 102 is operative to manage the system 100A, 100B and execute the methods of the present invention. The central controller 102 may be implemented as one or more system controllers, one or more dedicated hardware circuits, one or more appropriately programmed general purpose computers, or any other similar electronic, mechanical, electro-mechanical, and/or human operated device. For example, in FIG. 1B, the central controller 102 is depicted as coupled to a third-party service provider server 118. In the embodiment of FIG. 1B, these two servers may provide the same functions as the central controller 102 alone in the embodiment of FIG. 1A.

The central controller 102 (and/or the third-party service provider server 118) may include a processor 200, such as one or more Intel® Pentium® processors. The processor 200 may include or be coupled to one or more clocks or timers (not pictured) and one or more communication ports 202 through which the processor 200 communicates with other devices such as the casino servers 112, 114, the user terminals 106, 108, 110, the gaming devices 120, 122, 124, 126, marketer devices 128, 130, and/or the third-party service provider server 118. The processor 200 is also in communication with a data storage device 204. The data storage device 204 may include any appropriate combination of magnetic, optical and/or semiconductor memory, and may include, for example, additional processors, communication ports, Random Access Memory ("RAM"), Read-Only Memory ("ROM"), a compact disc and/or a hard disk. The processor 200 and the storage device 204 may each be, for example: (i) located, entirely within a single computer or other computing device; or (ii) connected to each other by remote communication medium, such as a serial port cable, a LAN, a telephone line, radio frequency transceiver, a fiber optic connection or the like. In some embodiments for example, the central controller 102 may comprise one or more computers (or processors 200) that are connected to a remote server computer operative to maintain databases, where the data storage device 204 is comprised of the combination of the remote server computer and the associated databases.

The data storage device 204 stores a program 206 for controlling the processor 200. The processor 200 performs instructions of the program 206, and thereby operates in accordance with the present invention, and particularly in accordance with the methods described in detail herein. The present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. The program 206 may be stored in a compressed, uncompiled and/or encrypted format. The program 206 furthermore may include program elements that may be generally useful, such as an operating system, a database management system and device drivers for allowing the processor 200 to interface with computer peripheral devices. Appropriate general purpose program elements are known to those skilled in the art, and need not be described in detail herein.

Further, the program 206 is operative to execute a number of invention-specific modules or subroutines which may include (but are not limited to) one or more routines to identify a user at a user terminal 106, 108, 110 as a potential user of a custom configured gaming device 120, 122, 124, 126; one or more routines to receive information about a user; one or more routines to provide casino feature information to a user at a user terminal 106, 108, 110; one or more routines to generate a preparation code and associate it with a player's preparation data; one or more routines to store a player's preparation data; one or more routines to securely communicate stored preparation codes and the associated preparation data to the casino servers 112, 114, one or more routines to facilitate and control communications between casino servers 112, 114, gaming devices 120, 122, 124, 126, marketer devices 128, 130, user terminals 106, 108, 110, the central controller 102, and/or a third-party service provider server 118; and/or one or more routines to control databases or software objects that track information regarding users, casinos, merchants, other third-parties, user terminals 106, 108, 110, gambling results, preparation data, preparation codes, casino features, gaming devices 120, 122, 124, 126, and fulfillment of user requests. Examples of these routines and their operation are described in detail below in conjunction with the flowchart depicted in FIG. 14.

According to some embodiments of the present invention, the instructions of the program 206 may be read into a main memory of the processor 200 from another computer-readable medium, such from a ROM to a RAM. Execution of sequences of the instructions in the program 206 causes processor 200 to perform the process steps described herein. In alternative embodiments, hard-wired circuitry or integrated circuits may be used in place of, or in combination with, software instructions for implementation of the processes of the present invention. Thus, embodiments of the present invention are not limited to any specific combination of hardware, firmware, and/or software.

In addition to the program 206, the storage device 204 is also operative to store (i) a user database 208, (ii) a trip documentation database 210, (iii) a gambling circle database 212, and (iv) a preparation database 214. The databases 208, 210, 212, 214 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though four separate databases are illustrated, the invention could be practiced effectively using one, two, three, five, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention. These processes are described below in detail with respect to FIG. 14.

Turning to FIG. 3, a block diagram depicting an example a casino server 112 includes a processor 300 coupled to a communications port 302, a data storage device 304 that stores a casino server program 306, a local copy of relevant entries of the user database 308, and a local copy of relevant entries of the preparation database 314. In embodiments in which, for example, the central controller 102 serves/controls multiple casinos operated by different entities, a casino may wish to have a local copy of the portions of the central controller's databases 208, 210, 212, 214 that include entries related to that casino and exclude other casinos' access to that casino's information. Thus, the example embodiment of a casino server 112 depicts local copies of some of the databases 208, 210, 212, 214 to illustrate this point. This redundant configuration may provide enhanced system performance by reducing network communications. A casino server program 306 may include one or more routines to respond to requests from gaming devices 120, 122, 124, 126 for preparation data for, in some embodiments, particular players or, in other embodiments, specified preparation codes. In other words, the local copy of the user database 308 may provide the casino server program 306 with access to information about specific players while the local copy of the preparation code database 314 may provide access to the preparation data. In some embodiments, local copies of the databases are not stored on the casino server 112 and instead, the casino server program 306 accesses the user database 208 and the preparation database 214 stored and maintained on the central controller 102. Likewise, in some embodiments, the database may only exist on the casino server 112 and the central controller 102 accesses the casino server 112 for the data. This distributed configuration may provide enhanced system security by allowing different casinos to store and maintain their own databases.

Turning to FIG. 4, a block diagram of an example user terminal 106 is depicted. A user terminal 106 according to the present invention may include a processor 400 coupled to a communications port 402, a data storage device 404 that stores a user terminal program 406, an output device 408, and an input device 412. A user terminal program 406 may include one or more routines to facilitate and control communications and interaction with the central controller 102 as well as a user interface to facilitate communications and interaction with a player. Example display screen images of such a user interface are provided in FIGS. 7 and 8. An optional security device (not pictured connected to the processor 400 may provide a facility to support secure communications via encryption, for example.

In addition, a user terminal 106 may include additional devices to support other functions. For example, a user terminal 106 embodied in a personal computer may additionally include a printing device for generating a coupon or a barcode representative of a preparation code. In some embodiments, users may be issued cashless gaming receipts that they can print (along with the preparation code) as an incentive to follow through and conic to a sponsoring casino location. In some embodiments, user devices such as PDAs or cell phones may be used in place of or in addition to user terminals 106, 108, 110. Many different types of input and output devices may be used in conjunction with a user terminal 106. Uses of various different user terminal 106 components are discussed below in the description of the methods of the present invention.

Turning to FIG. 5, a block diagram of an example gaming device 120 is depicted. In addition to apparatus to support gaming functions, a gaming device 120 according to the present invention may include a processor 500 coupled to a communications port 502, a data storage device 504 that stores a gaming device program 506, a display screen 508, a tracking card reader 510, a user input device 512, and, in some embodiments, a player device (not pictured). A gaming device program 506 may include one or more routines to facilitate and control communications and interaction with the casino server 112 and/or in some embodiments, an interface to facilitate communications and interaction with the central controller 102, the third-party service provider server 118, and/or a user terminal 106.

A gaming device 120 according to some embodiments of the present invention may be implemented in any number of devices such as, for example, a slot machine, a processor based cash register, telephone, an IVR system, a cellular/wireless phone, a vending machine, a pager, a personal computer, a portable computer such as a laptop, a wearable computer, a palm-top computer, a hand-held computer, and/or a PDA. In some embodiments, a user device such as a PDA or cell phone may be used in place of, or in addition to, some or all of the gaming device 120 components depicted in FIG. 5.

In operation, the tracking card reader 510 may be used to identify a player to the system 100A, 100B. In some embodiments, the gaming device program 506 may use the identity of a player determined via the tracking card reader 210 as an index into a copy of the preparation code database 314 residing on the casino server 112. Thus, in some embodiments the gaming device 120 is operable to retrieve a preparation data associated with a player using the player's tracking card information. In some embodiments, the gaming device program 506 may be further operative to configure the gaming device 120 based on the retrieved preparation data.

Turning to FIG. 6, a block diagram of an example marketer device 128 is depicted. A marketer device 128 according to the present invention may include a processor 600 coupled to a communications port 602, a data storage device 604 that stores a marketer device program 606 and a product database 608, an input device 610, and an output device 612. A marketer device program 606 may include one or more routines to facilitate and control communications and interaction with the central controller 102 as well as a user interface to facilitate communications and interaction with a merchant. In some embodiments, a product database 608 may be used by a marketer in determining what products to offer a user based upon the preparation data provided by the user.

Figure 7:
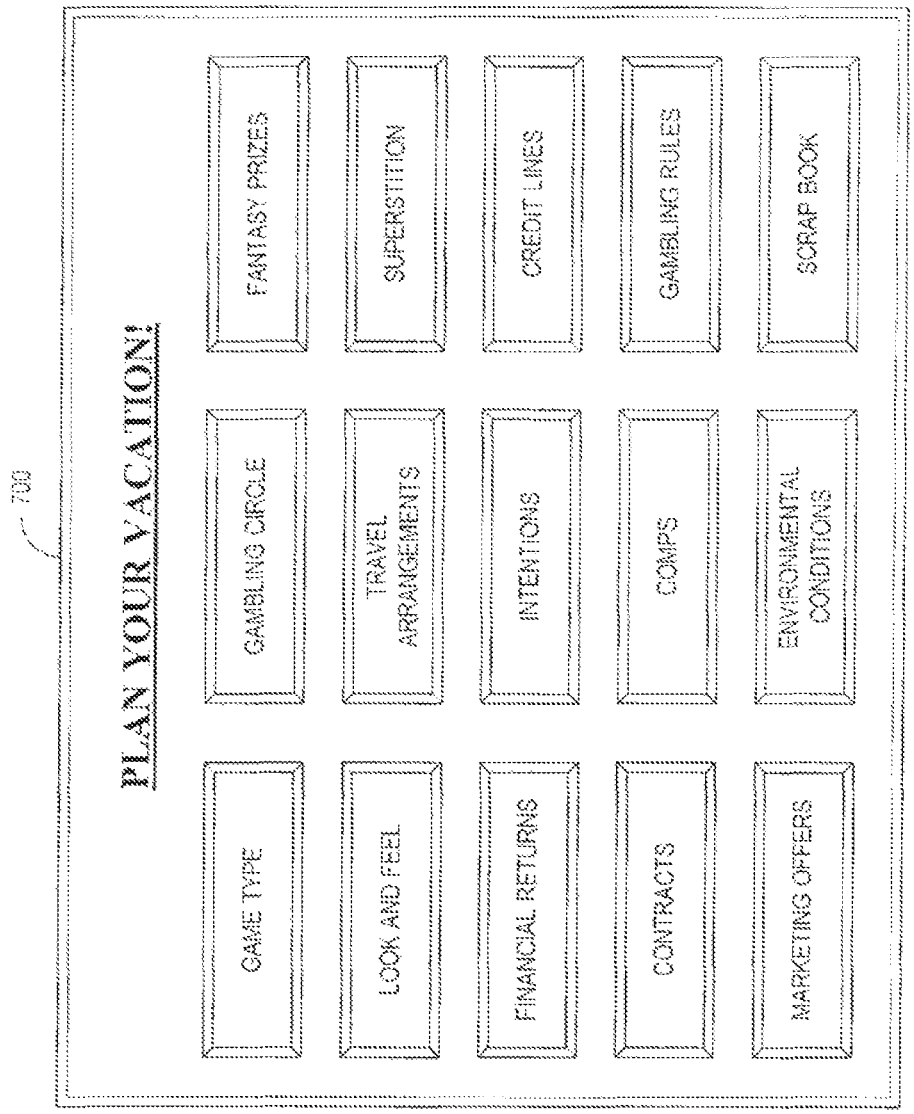
FIG. 7 is a drawing illustrating an example of a preparation menu screen as it may be displayed on a user terminal 106 for use with some embodiments of the present invention.

Turning to FIG. 7, an example embodiment of a preparation menu screen 700 as it may be displayed on the output device 408 of a user terminal 106 is depicted. The example preparation menu screen 700 includes several choices that each lead the user to sub-menus for developing preparation data. The choices may include "Game Type," "Look and Feel," "Financial Returns," "Contracts," "Marketing Offers," "Gambling Circle," "Travel Arrangements," "Intentions," "Comps," "Environmental Conditions," "Fantasy Prizes," "Superstition," "Credit Lines," "Gambling Rules," and "Scrap Book." Each of these menu choices are discussed in detail below with respect to the methods of the invention. In some embodiments, a preparation menu screen 700 may be presented to users outside a casino while they are operating a user terminal 106 and/or to users inside a casino while they are operating a gaming device 122 (or any appropriate casino device). In some embodiments, a preparation menu screen 700 may be implemented as a Web page stored remotely but viewed locally via a Web browser. In some embodiments, a preparation menu screen 700 may be implemented as a program that executes locally on a user terminal 106 and/or on a gaming device 122 (or any appropriate casino device).

Figure 8:
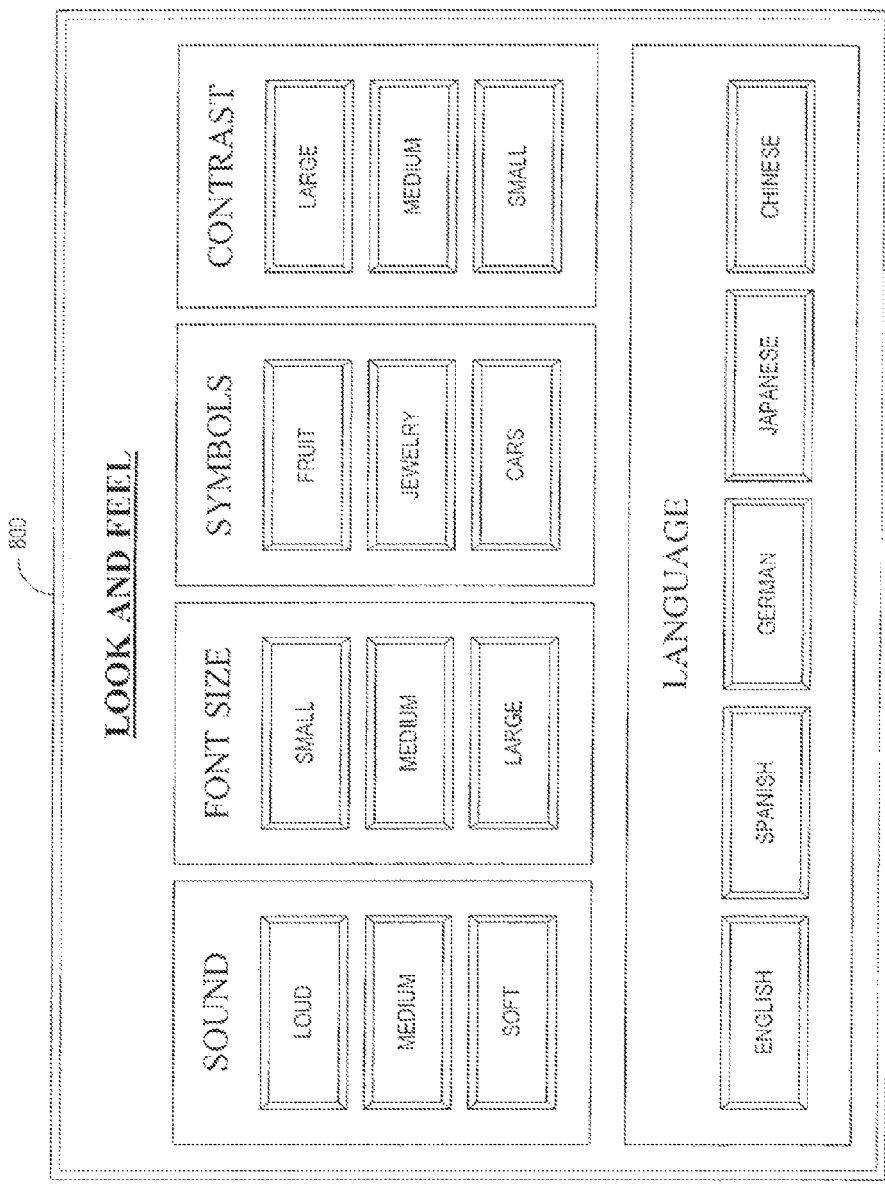
FIG. 8 is a drawing illustrating an example of a preparation sub-menu screen as it may be displayed on a user terminal 106 for use with some embodiments of the present invention.

Turning to FIG. 8, an example embodiment of a preparation sub-menu screen 800 is depicted. The particular sub-menu depicted in FIG. 8 is an example of a screen image that may be presented in response to a user selecting the "Look and Feel" choice from the preparation menu screen 700. The preparation sub-menu screen 800 presents five example feature selection controls for indicating (i) a sound level selection (loud, medium, soft), (ii) a font size selection (small, medium, large), (iii) a symbol selection (fruit, jewelry, cars), (iv) a contrast selection (large, medium, small), and (v) a language selection (English, Spanish, German, Japanese, Chinese) for a gaming device 120. In operation, a user terminal 106 (or casino device) executing a browser program may be used to access a central controller 102 to retrieve a Web page (as depicted in FIG. 8) that presents the above-described feature selection controls specific to a particular gaming device. 120 available at a casino location the player intends to visit. The user may click on one button in each of the five feature selection controls to indicate his choice. The user terminal 106 is further operative to communicate the player's selections and responses to other sub-menu questions (together representing preparation data) back to the central controller 102 for storage in the preparation database 208. In some embodiments, the preparation data is stored indexed by a preparation code that is provided to the user via the user terminal 106.

D. DATABASES

As indicated above, it should be noted that although the example embodiment depicted in FIGS. 2, 3, and 6 include five particular databases stored in storage devices 204, 304, 604, other database arrangements may be used which would still be in keeping with the spirit and scope of the present invention. In other words, the present invention could be implemented using any number of different database files or data structures, as opposed to the five depicted in FIGS. 2, 3, and 6. Further, the individual database files could be stored on different servers (e.g. located on different storage devices in different geographic locations, such as on a third-party service provider server 118). Likewise, the programs 206, 306, 606 could also be located remotely from the storage devices 204, 304, 604 and/or on another server. As indicated above, the programs 206, 306, 606 include instructions for retrieving, manipulating, and storing data in the databases 208, 210, 212, 214, 308, 310, 608 as necessary to perform the methods of the invention as will be further described below.

1. User Database

Figure 9:
FIG. 9 is a table illustrating an example data structure of an example user database 208 as depicted in FIG. 2 for use in some embodiments of the present invention.

Turning to FIG. 9, a tabular representation of an embodiment of a user database 208 according to some embodiments of the present invention is illustrated. This particular tabular representation of a user database 208 includes sample records or entries which each include information regarding a particular user. In some embodiments of the invention, a user database 208 is used to track such things as player identity, player financial account information, player demographic information, and player gambling performance information, as well as to associate players with preparation codes. Those skilled in the art will understand that such a user database 208 may include any number of entries or additional fields.

The particular tabular representation of a user database 208 depicted in FIG. 9 includes seven fields for each of the entries or records. The fields may include: (i) a user identifier field 900 that stores a representation uniquely identifying the user; (ii) a name field 902 that stores a representation of the user's name; (iii) a financial account identifier field 904 that stores a representation of a bank account number, a credit card number, or other financial account information needed to charge an account; (iv) a demographic field 906 that stores a representation of a description of demographic information about the user; (v) a machine identifier field 908 that stores a representation uniquely identifying a gaming device 120 upon which the user played; (vi) a lifetime theoretical win field 910 that stores a representation of the user's lifetime theoretical win; and (vii) a preparation code field 912 that stores a representation of a preparation code associated with the user that serves as a pointer into the preparation database 214.

The example user database 208 depicted in FIG. 9 provides example data to illustrate the meaning of the information stored in this database embodiment. A player identifier 700 (e.g. "P111123", "P22234") may be used to identify and index the players listed in the player database 610. Two examples of player information are provided: "Sam Brown" with credit card number "1111-1111-1111-1111" is a "male, age 23" who played on gaming device "M234" and has a lifetime theoretical win of "$2,343.00" and "Linda Jones" with bank account number "2222-2222-2222-2222" is a "female, age 47" who played on gaming device "M532" and has a lifetime theoretical win of "$765.00." Sam Brown has provided the casino with preparation data that may be retrieved from the preparation database using the associated preparation code "C8331" and for Linda Jones, "C5006."

2. Trip Documentation Database

Turning to FIG. 10, a tabular representation of an embodiment of a trip documentation database 210 according to some embodiments of the present invention is illustrated. This particular tabular representation of a trip documentation database 210 includes sample records or entries which each include information regarding a particular user's preparation data that describe how that user desires his trip to be documented. In some embodiments of the invention, a trip documentation database 210 is used to track such things as user identity, trip identity, photographs of the user, recording criteria, and deliverables. Those skilled in the art will understand that such a trip documentation database 210 may include any number of entries or additional fields.

The particular tabular representation of a trip documentation database 210 depicted in FIG. 10 includes six fields for each of the entries or records. The fields may include: (i) a user identifier field 1000 that stores a representation uniquely identifying the user; (ii) a trip identifier field 1002 that stores a representation uniquely identifying the user's trip to the casino; (iii) a photo identifier field 1004 that stores representations uniquely identifying each of the photos that have been taken of the user during his trip; (iv) an outcome identifier field 1006 that stores representations uniquely identifying each of the user's outcomes that have been recorded during his trip; (v) a recording criteria field 1008 that stores a representation of a description of what the player has requested to document during the trip; and (vi) a deliverable field 1010 that stores a representation of the form of presentation of the trip documentation the player has requested.

The example trip documentation database 210 depicted in FIG. 10 provides example data to illustrate the meaning of the information stored in this database embodiment. A user identifier 1000 (e.g. P111666; P222777; P333888; P444999) may be used to relate users to their particular trip documentation preparation data. A trip identifier 1002 (e.g. T222222; T333333; T444444; T555555) may be used to specify a user's particular trip when, for example, a user visits a casino more than once.

A photo identifier 1004 (e.g. Ph100000, Ph100001, Ph100999; Ph200002, Ph200010; Ph300333; N/A) may be used to reference all the photographs a casino has taken of a user based on the recording criteria 1008 (e.g. "Take a picture when I win more than $10"; "Take a picture every hour"; "Take a picture when I win $100 or more, and overlay a shot of the slot screen"). The deliverable 1010 for a photo recording criteria 1008 may be, for example, a photo "album with 100 pictures"; an "embossed album with 300 pictures"; a photo "album with 100 pictures"; or "5 T-shirts with pictures."

An outcome identifier 1006 (e.g. OC123456; OC500001, OC500002, OC500003) may be used to reference all the user's outcomes that a casino has recorded based on the recording criteria 1008 (e.g. "Take a picture when I win $100 or more, and overlay a shot of the slot screen"; "Record all my outcomes"). The deliverable 1010 for an outcome recording criteria 1008 may be, for example, a "software program that reenacts all outcomes."

3. Gambling Circle Database

Turning to FIG. 11, a tabular representation of an embodiment of a gambling circle database 212 according to some embodiments of the present invention is illustrated. This particular tabular representation of a gambling circle database 212 includes sample records or entries which each include information regarding a member of a particular user's gambling circle. In some embodiments of the invention, a gambling circle database 212 is used to track such things as gambling circle members' identity, contact information, and benefits, as well as to associate players with their gambling circle members. Note that a gambling circle may include any number of members. Those skilled in the art will understand that such a gambling circle database 212 may include any number of entries or additional fields.

The particular tabular representation of a gambling circle database 212 depicted in FIG. 11 includes six fields for each of the entries or records. The fields may include: (i) a user identifier field 1100 that stores a representation uniquely identifying the user; (ii) a beneficiary identifier field 1102 that stores a representation uniquely identifying a member of the user's gambling circle as a beneficiary of the user's gambling; (iii) a name field 1104 that stores a representation of the beneficiary's name; (iv) an email field 1106 and (v) an address field 1108 that store a representation of the beneficiary's contact information; and (vi) a benefit field 1110 that stores a representation of the benefit that the beneficiary will receive if any.

The example gambling circle database 212 depicted in FIG. 11 provides example data to illustrate the meaning of the information stored in this database embodiment. Referring to the first record, as part of his preparation data, user "P555555" has specified "B111111," who is more commonly known as "Adam Finsky," as a member of the user's gambling circle and a beneficiary of "5% of any jackpot above $1000" that the user wins. Adam Finsky has the email address adam@aol.com and lives in "Anyplace, USA."

Referring to the second record, as part of his preparation data, user "P666666" has specified. "B222222," who is more commonly known as "Laura Tanner," as a member of the user's gambling circle and a beneficiary of "5% of net winnings" that the user wins. Laura Tanner has the email address ltanner@ibm.com and lives in "Someplace, USA."

Referring to the third record, as part of his preparation data, user "P777777" has specified "B333333," who is more commonly known as "Jack Tinsel," as a member of the user's gambling circle and a beneficiary of "buffet for every $200 gross winnings" that the user wins. Jack Tinsel has the email address tinsel@home.com and lives in "Somewhere; USA."

4. Preparation Database

Turning to FIG. 12, a tabular representation of an embodiment of preparation database 211 according to some embodiments of the present invention is illustrated. This particular tabular representation of a preparation database 214 includes three sample records or entries which each include information regarding a particular user's preparation data. In some embodiments of the invention, a preparation database 214 is used to track information descriptive of user specified preferences, intentions, and/or plans related to the user's gambling vacation. In the specific example depicted in FIG. 12, the preparation database is structured to store and track user specified preferences related to gaming device configurations such as the game type, default denomination of play, language, currency, noise level, and font size. It should be understood that other data structures, such as the gambling circle database 212 and the trip documentation database 210 described, above, may be used to track other forms and types of preparation data. Those skilled in the art will understand that a preparation database 214 may include any number of entries or additional fields.

The particular tabular representation of a preparation database 214 depicted in FIG. 12 includes nine fields for each of the entries or records. The fields may include: (i) a preparation code field 1200 that stores a representation uniquely identifying a particular customized configuration; (ii) a game type field 1202 that stores a representation of the selected game type; (iii) a denomination field 1204 that stores a representation of the selected default denomination that the gaming device will accept; (iv) a language field 1206 that stores a representation of the selected language to be used by the gaming device; (iv) a currency field 1208 that stores a representation of the selected currency to be used by the gaming device; (v) a noise level field 1210 that stores a representation of a description of a sound effects volume of the gaining device; (vi) a font size field 1212 that stores a representation of the size that characters will be displayed on the gaming device; vii) a picture title/picture field 1214 that stores the name of a picture and the picture itself that the player would like to be displayed when he hits a jackpot (and/or any winning outcome); and (viii) a music title/music field 1216 that stores a representation of the name of music and the music itself that the player would like to be played when he hits a jackpot (and/or any winning outcome).

The example preparation database 214 of FIG. 12 provides example data to illustrate the meaning of the information stored in this database embodiment. A preparation code 800 (i.e. C5006, C9224, C8331) may be used to identify and index preparation data received from users. Examples of game types include reel slots, video poker, and blackjack. Example denominations include $1.00, $0.25, and $5.00. Example languages include English and Japanese, and example currencies include the US dollar and the yen. Example noise levels include high, medium, and low and example font sizes include medium, small and large. Example pictures include an image of a user's poodle, an image of another user's grandson, and an image of yet another user's hamster. Example music includes "Macarena," "My Way," and "Beethoven's $9^{th}$."

5. Product Database

Turning now to FIG. 13, a tabular representation of an embodiment of a product database 608 according to some embodiments of the present invention is illustrated. This particular tabular representation of a product database 608 includes sample records or entries which each include information regarding a particular product that may be used in a marketing promotion. In some embodiments of the invention, a product database 608 is used by a marketer in determining what product to offer a user in different marketing offers. Those skilled in the art will understand that such a product database 608 may include any number of entries or additional fields.

The particular tabular representation of a product database 608 depicted in FIG. 13 includes five fields for each of the entries or records. The fields may include: (i) a product identifier field 1300 that stores a representation uniquely identifying the product; (ii) a description field 1302 that stores a representation that is descriptive of the product; (iii) manufacturer field 1304 that stores a representation of the name of the manufacturer or supplier of the product; (iv) a retail price field 1306 that stores a representation of a retail price of the product; and (v) an excess inventory field 1308 that stores a representation of the number of units of the product available for use with marketing offers.

The example product database 608 depicted in FIG. 13 provides example data to illustrate the meaning of the information stored in this database embodiment. A product identifier 1300 (e.g. "PR888"; "PR999"; "PR222"; "PR333") may be used to identify and index the products listed in the product database 608. Four example entries of product information are provided: (i) "45" "eight-speed blender[s]" with an "$80" retail price and manufactured by "Anycorp" Inc. are available for use with marketing offers; (ii) "0" "washing machine[s]" with an "$800" retail price and manufactured by "Somecorp" Inc. are available for use with marketing offers; i) "90" "color TV[s]" with a "$200" retail price and manufactured by "Bigcorp" Inc. are available for use with marketing offers; and (iv) an "unlimited" number of "6 month cable service" subscriptions with an "$180" retail price and provided by "XYZ Broadcasting" Inc. are available for use with marketing offers.

6. Casino Database

Although not illustrated with a detailed example, some embodiments of the present invention may include a casino database that may reside on a casino server 112 and/or a central controller 102. A casino database may be used to store the unique configurable features of a particular casino where there are multiple different types of options such as, for example, multiple different types of gaming devices 120, 122, 124, 126. For example, such a database might list the different configurable features for each type of game at a particular casino possibly indexed by machine identifier and then each of the possible values for each feature. A casino database may be used as a data source to assemble, for example, a Web page that looks like the screen image of FIG. 8. Alternatively, the same screen image could be generated without a casino database. However, where there are many different options available, using a casino database may reduce and simplify the resources required to generate screen images similar to that of FIG. 8.

E. PROCESS DESCRIPTIONS

The system discussed above, including the hardware components and the databases, are useful to perform the methods of the invention. However, it should be understood that not all of the above described components and databases are necessary to perform any of the present invention's methods. In fact, in some embodiments, none of the above described system is required to practice the invention's methods. The system described above is an example of a system that would be useful in practicing the invention's methods. For example, the user database 210 described above is useful for tracking users and information about them, but it is not absolutely necessary to have such a database in order to perform the methods of the invention. In other words, the methods described below may be practiced using a conventional player tracking list in conjunction with a casino's conventional accounting system.

Figure 14:
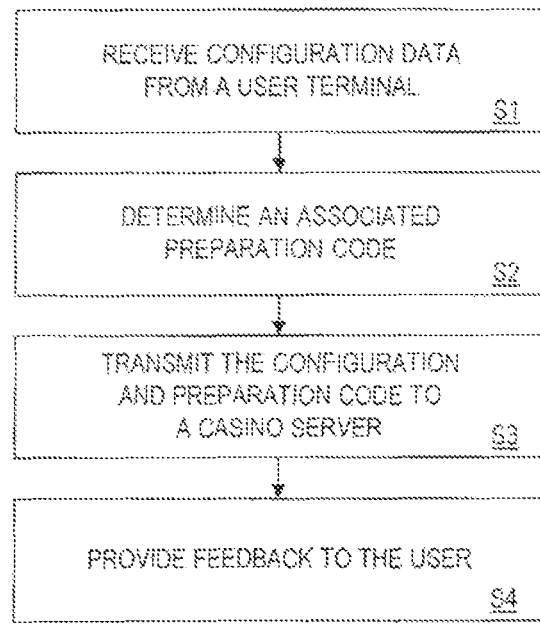
FIG. 14 is a flow diagram illustrating an exemplary process for planning and customizing a gaming experience according to and for use in some embodiments of the present invention.

Referring to FIG. 14, a flow chart is depicted that represents some embodiments of the present invention that may be performed by the central controller 102 (FIGS. 1A and 1B), an external third-party, and/or an integrated third-party entity/device such as a third-party service provider server 118. It must be understood that the particular arrangement of elements in the flow chart of FIG. 14, as well as the order of example steps of various methods discussed herein, is not meant to imply a fixed order, sequence, and/or timing to the steps; embodiments of the present invention can be practiced in any order, sequence, and/or timing that is practicable.

In general terms and referring to FIG. 14, method steps of an embodiment of the present invention may be summarized as follows. In Step S1, the central controller 102 receives configuration or preparation data from a player at a user terminal 106. In Step S2, a preparation code associated with the configuration data is determined. In Step S3, the configuration data and the associated preparation code are transmitted from the central controller 102 to a casino server 112. In Step S4, the central controller 102, or another device, provides feedback to the user.

In some embodiments, the feedback may include the casino server 112 configuring and/or operating a gaming or other casino device. In some embodiments, the casino server 112 may configure and/or operate a gaming or other casino device in response to receiving a preparation code from a user via the gaming or other casino device. In such an embodiment, the gaming or other casino device is configured according to the configuration data associated with the received preparation code.

In the subsections that follow, each of these steps will now be discussed in greater detail. Note that not all of these steps are required to perform the method of the present invention and that additional and/or alternative steps are also discussed below. Also note that the above general steps represent features of only some of the embodiments of the present invention and that they may be combined and/or subdivided in any number of different ways so that the method includes more or fewer actual steps. For example, in some embodiments many additional steps may be added to update and maintain the databases described above, but as indicated, it is not necessary to use the above described databases in all embodiments of the invention. In other words, the methods of the present invention may contain any number of steps that are practicable to implement the processes described herein.

1. Step S1: Receive Configuration Data from a User Terminal

In some embodiments, the user may initially submit preparation data (or configuration data) to the system 100A, 100B. In some embodiments, the user may log onto the central controller 102 with a user terminal 106, for example, using a personal computer. As indicated above, other suitable user terminals 106 may include personal digital assistants, telephones, kiosks, ATMs, slot machines, and/or vending machines including such devices as gasoline pumps and point-of-sale terminals.

The user may interact with a Web site hosted by the central controller 102. To log on, the user may input a name, password, code, and/or other identifier. The user may then input preparation data in various ways. In some embodiments, the user selects preparation data from a number of menus, each menu covering a different subject (as illustrated in FIGS. 7 and 8 and described in the accompanying text). For example, within the "Look and Feel" category, a first menu may allow a user to select a gaining device's game, font size, reel speed, language, volume, and other attributes pertaining to the look and feel of the device. A second menu might allow a user to provide information about himself so as to receive tailored marketing offers at the gaming device. Menus might take the form of pull-down menus, check boxes, and so on. Menus might list headings for preparation data and allow a user to enter the data. For example, a heading may be "Font Size" and in response the user may type in "12" for "12 point." Many other menu systems are possible.

In some embodiments, a user may enter preparation in text form. The text may then be interpreted by a human operator and/or by a computer program.

In some embodiments, a user may create or alter graphics as a means of inputting preparation data. For example, the controller's Web site may present a graphical depiction of a screen on a gaining device. Using his mouse, the user may delineate a portion of the screen in which to receive marketing offers, and another portion of the screen in which to play the game. The user may use his mouse to delineate areas of the screen that are to serve as new input buttons to the gaming device. For example, the user might designate a small, square area on the slot screen to be an "I accept" button, for use in accepting marketing offers.

The following sub-sections describe several different categories of preparation data the user may designate. The list is not intended to be an exhaustive enumeration of every possible category of preparation data, but rather an illustrative set of examples of types of preparation data.

(i) Information about the User and the Marketing Offers the User Desires

Many companies are constantly trying to acquire new customers to facilitate growth. One effective means of acquiring a customer is for a company to pay a user for his business. For example, a phone company might pay a user $25.00 if the user agrees to make the phone company his long distance provider. Such a deal may be beneficial to the phone company, since the lifetime value of the customer to the company may far exceed the $25.00 acquisition cost.

A casino is a fertile environment for customer acquisition. Gaming devices 106 are capable of immediately dispensing money to consumers. Therefore, a user who is at a gaining device may agree to do business with a company and then may immediately receive his payment, rather than waiting a week or more for a check to arrive in the mail. Furthermore, casino patrons are often especially motivated to make deals for money. A user may be feeling frustrated from having sustained a loss, for example, and may wish to recover the loss by accepting a marketing offer. The casino itself may be content to facilitate such transactions between users and marketers because the transactions put more available potential wager finds in the hands of users. This also pleases users.

Thus, a portion of a user's preparation data may pertain to a user's interaction with marketers. Users may submit information that a marketer might use to tailor offers to a user. Examples of such information include the user's age, place of residence, income, job type, education level, marital status, number of children, and other demographic information. User purchasing history may be valuable to a marketer. For example, a marketer selling cars would want to know whether the user buys a new car every three years. Other such questions may include "Does the user like to remodel rooms in his house?" or "What type of food does the user like?" User possessions may be relevant to marketers. For example, does the user currently own a car?, a washing machine?, or a wide screen TV? A user's budget is meaningful. For example, marketers would want to know how much money a user has to spend on new items. Whether the user is accompanied on his vacation may be relevant. For example, if a user's spouse is with him on the vacation, a marketer may pitch goods as gifts for the user's spouse.

Other preparation data may include the circumstances under which a user would like to receive marketing offers. Possible circumstances include: the user has just won a payout in excess of a certain threshold; the user has accumulated winnings in excess of a certain threshold; the user has sustained losses in excess of a certain threshold; the user has just inserted a bill, such as a $100 bill, into a gaming device; a particular time of day occurs, for example, the clock has struck noon and the user would like lunch offers from local restaurants; it is a particular date; particular weather conditions have transpired; and the user just pressed a button or otherwise indicated that he desires a marketing offer. In this last case, preparation data may include a specification of how a user will indicate his desire for a marketing offer. For example, the user may be instructed to pull the handle of the gaming device twice in rapid succession. The user might also request a special area on a gaming device's touch screen to appear as a "marketing button" that the user might touch in order to receive marketing pitches or offers. An additional relevant circumstance might be when an event or occurrence has not just happened. For example, a user may be comfortable receiving offers at any time except when he has just won on the last three handle pulls or hit a jackpot.

Still other preparation data might include the types of offers a user would like to receive. Types of offers may include: offers for certain categories of products, for example, the user would like to receive offers for new refrigerators, new blenders, or used lawn mowers; offers within a certain price range, for example, the user would like marketers to offer to sell the user items with prices between $100 and $200; offers for products versus services, for example, the user may prefer only offers to sell products, or only offers to sell services; and offers providing a certain benefit. The user may prefer offers that provide him with benefits of at least $20. For example, the user may be offered a benefit of $30 for switching long distance phone services to AT&T.

The user may commit in advance to accept marketing offers provided certain conditions are met. For example, the user will switch phone services to receive $30 in credits if he loses $30 at a gaming device. Otherwise, the user need not switch phone services.

The user may specify where benefits from offers should be placed. The benefits might be put directly onto a user's credit balance at a gaming device 120. Benefits might also be deposited directly to a user's financial account. Benefits might be sent directly to a user's home or work address in the form of cash, check, or non-monetary prize. Benefits may be placed directly into a user's account at a casino or at the central controller 102.

Preparation data may further include how the user will indicate, at a gaming device 120, his desire to receive marketing offers. A special area of a touch screen on a gaming device may be designated for marketing offers. When the user touches that area, he receives a marketing offer. Alternatively, an existing button on a gaming device that the user does not use may have its function reassigned to that of a marketing button. For example, the "bet maximum credits" button may become the marketing button for a particular user.

A marketer may transmit offers to a user in a number of ways. The marketer may leave offers with the central controller 102, to be later transmitted to users with qualifying characteristics. The marketer may then compensate the central controller 102 for every offer made, for every offer accepted, etc. In some embodiments, the marketer may communicate with a user in real time via the central controller 102. The marketer may have real-time access data about users currently at gaming devices 120 or at user terminals 106, and may then make its own determinations as to when to make offers. In offering products to a user, the marketer may refer to a product database 608. The marketer may select from the database products that are priced appropriately for a user, that meet other user criteria, and/or that have excess inventory.

(ii) Information of a Psychological or Superstitious Nature

There is much superstition associated with gaming devices 120. For example, gaming devices may be known as "hot" when they have recently paid out more than they have taken in. Similarly, gaming devices 120 that have not paid out recently may be called "cold." Users may wish to know which gaming devices 120 are hot so that they can play on the hot devices. The user may also wish to know what types of people have good luck on particular gaming devices, so that the user may find a gaming device that best suits him. For example, if a user is a 56 year-old female born in February, then she may wish to find a gaming device that has previously paid a jackpot to a 56 year-old female born in February. Further, users might wish to know about prior winners at a gaming device. For example, they might want to know a prior winner's name; age; date of birth; time of birth; place of birth; astrological sign (e.g. Scorpio, Aries); place of residence; nationality; gender; race; number of kids; date and time on which they won; etc.

A user might have particular statistics in mind when looking for a gaming device 120. For example, if a gaming device 120 has paid well for at least five Scorpios in the last week, then perhaps the gaming device 120 is likely to be profitable for another Scorpio. The user may then enter what statistics he finds desirable into the Web site of the central controller 102. To enter statistics, the user may fill in a form on the central controller's Web page. A line on the form might read, "Find me a machine that paid out a jackpot on this date." The user may then fill in the desired date.

The central controller 103 may search a database of gaming device statistics to find any that meet user criteria. If there are any such gaming devices 120, the central controller 103 may display information about them to the user. For example, the central controller 103 may display the gaming devices' location, appearance, and any reference number. The central controller 103 may also display one or more maps so as to guide the user to the gaming devices 120. A map might show, for example, the layout of a casino floor, with relevant gaming devices 120 highlighted. A user might elect to be shown a map of all machines that had not had a jackpot of $1000.00 or more in the last 24 hours. Another map might show the location of the casino in a city. Of course, the central controller 102 may be configured to display only machines located in a city where a user intends to visit, even if other machines satisfy user criteria.

At times, there may be a large number of gaming devices 120 meeting the user's criteria. The central controller 103 may encourage the user to enter additional criteria, or to narrow existing criteria so as to narrow down the number of machines. At other times, the user's criteria may not be met, and the central controller 102 may encourage the user to broaden his criteria. The central controller 102 may also display to the user gaming devices 120 that it considers close to meeting the user's criteria. Perhaps the gaming devices 120 meet nine out of ten user criteria.

In displaying gaming devices 120 to users, the central controller 102 may give priority to devices at casinos that have paid the central controller 102 more money. For example, if a first casino has paid the controller $0.02 per listing, and a second casino has paid the controller nothing, then a user may see gaming devices 120 from the first casino listed before machines from the second casino.

Rather than entering criteria for gaming devices 120 the user would like to play, the user might enter pertinent information about himself and allow the central controller 102 to find potentially suitable gaming devices 120. For example, the user might enter his own name, birth date, wedding date, college graduation date, gender, astrological sign, child's birth date, license plate number, and so on. The central controller 102 might then search for devices that have paid well for people with similar characteristics to the user. For example, the central controller 102 might search for devices that have paid more than $1000 on a single handle pull to a person with the same wedding date, within the past week. The central controller 102 might also search for devices with similar characteristics to the user. For example, the central controller 102 might look for devices whose date of manufacture or whose serial number is the same as the user's birthday.

In some embodiments, a central controller 102 receives user information, but does not provide the user with information about a suitable gaming device 120 until significantly later. For example, if the user is planning a trip to Atlantic City three months in advance, it might not be relevant to the user what gaming devices 120 are paying well at the moment. Therefore, just before the user is to leave for Atlantic City, the central controller 102 may tell the user what gaming devices 120 pay well, so that the user can leave with current information.

If the user aims to win money so as to buy particular merchandise, then the central controller 102 may allow the user to play directly for the merchandise he desires. For example, when the user plays at a gaming device 120, one of the payouts may be made in the form of the user's desired merchandise, rather than in the form of credits. Alternatively, the user may be told he can have his desired merchandise by accumulating a certain number of credits while playing at a gaming device 120. The number of credits a user needs may be far less then the retail price of the desired merchandise. The user may also be able to obtain his desired merchandise using complimentary points, even if the casino at which the user plays does not typically give out the user's desired merchandise.

(iii) Music and Pictures of Subjects of Sentimental Value to the User

A user may remotely input pictures or music. For example, the user may scan a picture of himself, his grandson, and/or of his pet poodle. The user might use a scanner attached to the user terminal. Then, when the user is at a gaming device, the user may select previously scanned pictures to display on the gaming device. For example, the user may select the picture of his poodle to display above the spinning slot reels. The user may even have his poodle incorporated as one of the symbols on the slot reels. To facilitate the selection of pictures by the user, the gaming device might display small versions of each picture the user has scanned. The user need then only touch the picture to have it enlarged and more clearly made visible. Alternatively, the user might provide names for the pictures he scans, such as "Poodle.gif". The user might then select this name from a list of names displayed on the gaming device, or he might simply type in the name using a keypad or other input device.

Other means are possible for transmitting user-selected images to the central controller, Many film developers post copies of pictures to Web sites. A user might obtain a copy of a picture he has taken from a film developer's Web site, and send it to the central controller. In some cases, the central controller may act as a film developer. A user might then be motivated to develop all of his pictures with the central controller, as the user would then be able to view the pictures on the screen of a gaming device while playing.

In some embodiments, a user submits printed photographs to the central controller via postal mail. The central controller may then scan the pictures and make them available for display on the user's gaming device. A user may also bring photographs or negatives of photographs to a casino. The casino can then scan or develop the pictures and have them digitized and ready for display on a gaming device.

While at a gaming device, a user may desire to view pictures other than those he has taken. He may therefore scan pictures from books or magazines, or obtain pictures from the Web. He may then transmit these to the central controller.

To input music remotely, a user has a number of options. The user may obtain a sound file, such as an MP3 from a Web site, such as MP3.com. The user may then transmit the sound file to the central controller. The controller can then store the sound file in the preparation database 214. The user may also record his own music using a microphone attached to his user terminal He may then transmit the digitized music to the central controller.

The central controller, a casino server, a casino, or a gaining device may filter out pictures or sound files deemed inappropriate. Computer programs may examine pictures or sound files and compare them to pre-established criteria in deciding whether to permit their use at a gaming device. Alternatively, humans may act as censors. Certain pictures or sound files may be permissible only under certain conditions. For example, a sound file may only be permissible if the user employs earphones, or if there is no one else in the vicinity.

(iv) Money Held in Reserve to Offset User Losses

A common fear among users is losing too much money at a casino. When the user runs out of money with which to gamble, the user may become bored. The user may also feel regret, embarrassment, or may even experience financial difficulties. Therefore, in some embodiments of this invention, the user may take steps to reduce the possibility of suffering excessive losses at a casino.

In some embodiments, the user performs work prior to visiting the casino. As compensation for his work, the user may receive insurance against losses. For example, in exchange for doing 5 hours worth of work, the user may be told, "If you lose $100, we'll replace your $100 so that you'll be even again." The insurance might be capped at a certain amount. The insurance might cover a percentage of losses. The insurance might also cover losses incurred only during certain time periods, or only at certain games. Other benefits for work may include: cash; credits; gambling tokens; reward points; increased odds of winning; increased prize tables; the ability to play dollar machines for a quarter; the free use of an extra slot in a multi-slot machine; the ability to play for free; the enablement of extra prize-winning symbols on a slot machine; the enablement of extra pay lines on the slot machine; and auxiliary benefits, such as free or subsidized meals or hotel rooms.

The user may perform work via the Internet. For example, the user may monitor the output of a security camera and send an email alert when he views any suspicious activity. The user thereby acts as a remote security guard. The user may answer survey questions of importance to marketers. The user may participate in focus groups online. The user may make visual comparisons of products and provide input on which has the better packaging. The user may perform his work using a Web site hosted by the central controller. The central controller may thereby monitor the user's work, and provide the user with benefits accordingly. In some embodiments, the user does work on a separate Web site. The Web site may be hosted by a merchant associated with the central controller. After performing work, the user may receive a code from the Web site and submit the code to the central controller in order to receive credit for his work. Alternatively, the merchant may contact the central controller directly, and inform the central controller of the user's work.

The user may also perform work off-fine. For example, the user may work to assist consumers at a department store. The user may then receive a code from the department store, submit the code to the central controller, and thus receive credit for the work he accomplished.

Instead of doing work, the user may receive insurance against losses, or other benefits, by agreeing to deals with merchants. For example, the user may agree to switch long distance phone services, or may agree to purchase a new car insurance policy. In exchange, the user may receive money that can be used to offset losses at a casino. In some embodiments, a user receives automatic benefits at a casino simply by doing business with a merchant. For example, for every dollar the user spends at Wal-Mart®, the user may receive three cents worth of insurance against losses.

In many cases, a user may have earned money in an account that can be used only to reimburse a user for his losses. The user may, however, visit the casino and win. It is then possible that the user might put the money in the account to other uses. For example, the user might be able to collect a percentage of the money in the account. The user might be able to apply money in the account towards the purchase of merchandise, food, a hotel room, gambling credits or other goods.

(v) User Credit Lines

Often, a user comes to a casino without sufficient cash to pay for the chips he wants. One option is for the user to go to an Automatic Teller Machine (ATM) or a cash advance machine. However, for some users, credit limits or daily withdrawal limits don't allow them to withdraw as much money as they would like. Therefore, a user may establish a credit line at the casino and draw a marker against the credit line. To take out a marker, a user may call up a casino in advance and request a credit line with the casino. The user will typically have to submit some information about himself, including a player tracking card number and checking account information. When the user arrives at the casino he may then present a voided check and several forms of identification. Once the casino grants the user a line of credit, the user can request a marker. A marker is a legally binding document, signed by the user, that the user will repay the casino for any chips given the user to play with. If the user does not repay, then the casino can cash the marker at a bank as if it were a check.

In some embodiments of this invention, the user may set up credit lines remotely using the Web site of the central controller. The user may input information of relevance to a casino in granting a credit line. Such information may include a name, home address, telephone number, email address, bank name, checking account number, amount of money in the checking account, citizenship, desired amount of credit, and so on. In some embodiments, the player also inputs the amount owed to other casinos.

This information may then be sent to a casino credit executive who may begin to decide whether to grant the credit line or not. Alternatively, user information may be examined by an automated program. The program may then help to decide whether or not the credit line should be granted. In some embodiments, the casino credit executive or the controller may check with Central Credit® to determine the user's credit history with other casinos. If the user is listed by Central Credit® as a poor credit risk, then the user may not be granted a credit line.

In some embodiments, the central controller may act as the entity that provides credit. The central controller may grant a credit line to a user. The user may then draw a marker at a casino. The casino may then be compensated immediately by the central controller in the amount of the marker. Then, when a user repays the amount of the marker, the casino can repay the central controller. The casino may pay a fee to the central controller for taking the risk.

Another way for a user to ensure sufficient funds for play at a casino is to wire money in advance to the casino. The user may wire money using the Web site of the central controller by providing the central controller with financial account information destination information, and an amount of money to be transferred.

(vi) Look and Feel of the Gaming Device

Prior to visiting a casino, the user may enter data describing a desirable machine interface. Aspects of the machine's interface may include font size, reel speed, language, screen resolution, length of the bonus rounds, amount of time between an initiation of a handle pull and the resolution of the outcome, types of symbols, and so on. Each aspect of the machine's interface may be selectable from a menu, or may be inputted by the user in a box on the central controller's Web site. Numerous gaming devices are general purpose in that the game played and the interface to the game played on the gaming device are coded in software. Thus, many gaming devices have the flexibility to provide a user with his desired interface.

(vii) Which Gaming Devices the User Would Like to Play

Using the Web site of the central controller, the user may have the opportunity to test different gaining device configurations, and different gaming devices themselves. In some embodiments, the user selects a gaming device configuration, and then the central controller displays a graphical representation of the gaining device in the selected configuration. For example, if the user has selected a gaming device configuration with five reels and three pay lines, then the user may view on the user terminal a graphical representation of a five reel gaining device with three pay lines. The user may simulate spins on his user terminal, with a simulated credit meter incrementing and decrementing based on simulated outcomes. By testing various gaming device configurations in advance, the user has the opportunity to see which configurations are pleasing to the senses. The user also can determine which configurations are lucky for him. Once the user has found a desired configuration, the central controller may indicate to the user where he might find actual gaming devices capable of supporting the desired configuration. For instance the central controller might show the user a map of a country, state, city, or casino floor, with relevant gaming devices or locations highlighted. The central controller may also provide the user with written directions to a gaming device.

On the controller's Web site, the user may also take the opportunity to test new games he otherwise would never have played. For example, a traditional mechanical reel player may test a video slot machine. Or a reel player may test a video poker or blackjack machine. In fact, the central controller may encourage and reward the user for trying games he does not usually play. For example, the central controller may offer the user a voucher for a free meal at a particular restaurant if the user plays a new word-bonus game for an hour on the central controller's Web site. Familiarizing a user with new games is advantageous for a casino, because the user is then comfortable playing a number of games at the casino, and is less likely to leave if one of the games no longer suits him. Therefore, casinos may compensate the central controller for any benefits given a user for testing new games.

After testing gaming device configurations, or new gaming devices on the controller's Web site, the user may reserve a gaming device to use at a casino. By making a reservation, the user may assure that he may approach a particular gaming device at an appointed time and find it not in use by other users. Thus, a reserved gaming device may freeze and unlock only for a particular user. However, if the user does not unlock the gaming device within a certain time period, then the device may become available to other users. The user may commit money so as to reserve a gaming device. The money may be an outright payment, or it may become part of a user's credit balance when the user appears at the gaming device. The user may forfeit part of the money if he does not appear at the reserved time. A reservation may also he linked to a hotel reservation. For example, part of a user's reservation package at a casino resort may be a room for three nights and a particular gaming device for three days from 3:00 P.M. to 6:00 P.M.

A user may also test new games that have not yet been placed on casino floors. The user may provide feedback on these games. The user's feedback may allow a gaming device manufacturer to make a decision on whether to move forward with the production of a game. Feedback may also help a casino to decide whether or not to purchase certain gaming devices. The user may be compensated for his feedback on new games. For example, the user may earn the privilege of being the first to play a new gaming device when it is introduced onto a casino floor.

(viii) Financial Returns of the Gaming Device

Prior to visiting a casino, the user may enter preparation data describing the way money is paid out from a gaming device. The user may specify such parameters as a frequency with which the device pays, the hold percentage, the size of the jackpot, the size of lesser payouts, the frequency with which particular payouts occur, and so on. The user will not necessarily get everything he asks for. For example, the user may not be allowed to have a gaming device configured to pay back more than 100%. The central controller may adjust certain parameters based on other parameters the user chooses. For example, if the user desires a high payout frequency, then the central controller may lower the odds of hitting a jackpot and increase the odds of hitting a low payout. Thus, the hold percentage of the machine may be held constant. If the user attempts to enter parameters that would force the machine to pay back more then 100% of coin-in, then the user may be prevented from doing so. For example, selection boxes on the central controller's Web site may be grayed out or disabled.

In some embodiments, the user may submit preparation data to configure a gaming device to pay back more than 100% of coin in. In such cases, the user may have to pay or may have to accept a marketing offer. The user may also he time-limited in his use of the gaming device under the specified configuration.

The user may also remotely indicate the types of bets he would like to make at a gaming device. The types of bets may not be ones that are currently enabled by a gaming device. For example, a user might wish to bet on the occurrence of an outcome that does not pay (i.e. a losing outcome). Then, if a normally losing outcome occurs, the user may receive a small pay out. The user may wish to bet on five cherries occurring within three consecutive spins, on obtaining a winning outcome for threes spins in a row, on obtaining a bar on the middle reel, etc. There are, in fact, an infinite number of statistics describing the outcomes of a gaining device, for which no bets exist.

When the user creates a non-standard bet, the central controller may calculate the odds of the user winning his bet, and may then determine an appropriate pay out for winning the bet. For example, a gaming device may determine that the odds of five cherries occurring within three particular consecutive spins are 21 to 1 against. To provide the casino with an advantage, the controller may determine that a 20 to 1 pay out is appropriate for a bet on the occurrence of five cherries in three particular consecutive spins.

(ix) The User Interface

A typical gaming device may have only a few limited mechanisms for user input. A device might have physical buttons, with labels such as "bet 1 credit", "bet maximum credits", "cash out", "hold", and "spin". The physical buttons may be replicated on a touch screen, so that a user might touch either a physical button or the touch screen of a gaming device in order to accomplish a particular function. However, to practice some embodiments of the present invention, or for other reasons, a user may require a richer interface to the gaming device. For example, the user may prefer to bet 7 credits on every handle pull of a gaming device. Rather than pressing the "bet 1 credit" button 7 times, the user might desire a special button reading "bet 7 credits". Therefore, using the Web site of the central controller, the user may create a desired user interface for a gaming device. The following is a partial list of other buttons a user may create for use in interacting with the gaining device.

Marketing buttons, such as "Give me an offer" or "Accept offer." These allow a user to receive and accept marketing offers so as to receive more gambling funds, insurance against losses, good deals, etc.

Buttons to make a particular type of bet, or a bet for a particular number of credits. For example, a button might place a bet on a particular character in the bonus round of a Monopoly™ game landing on a particular property. A button might place a bet on a losing outcome occurring.

A button to cash out only a particular number or a particular percentage of credits. For instance, a user may wish to cash out only enough credits to tip a waitress.

A button to undo whatever the last action was. Perhaps the user hit the "bet maximum credits" button by mistake, but has not yet made a handle pull. The user may wish to undo his last action and only bet 2 credits.

A button to redo a previous bet, game, or action. Perhaps the user's last bet covered 5 pay lines with 2 coins per line. The bet turned out a winner for the user. Therefore, the user may press the "redo" button to repeat the bet. The user may be at a video poker machine, and wish to draw once again to a royal flush (the draw having been unsuccessful on the previous hand). Pressing the "redo" button, the user may get the chance to draw once again to the royal flush. However, the second time around, the user may have to make a larger wager. A user may wish to redo a bet in a particular way. Perhaps the exact time at which the bet was made was fortuitous. For example, three and a half seconds past the minute mark. Perhaps it was the exact way in which he pulled the handle. The gaming device may automatically replicate the way the user pulled the handle on a first bet in making the second bet.

A button to bet fractional numbers of credits. For example, the user may bet one third of a credit on a handle pull by pressing a special button.

The new buttons created by the user may be displayed as areas on the touch screen of a gaming device. Alternatively, instead of creating a new button, a gaming device may understand inputs from an old button as having a new meaning. For example, a button that is labeled "bet maximum credits" on a gaming device may be understood as "give me an offer" when pressed by a particular user. Thus, the central controller may tell the user, "When you want to get a marketing offer, just press the 'bet maximum credits' button and ignore the meaning of what is written on the button." In some embodiments, gaming devices are manufactured with physical buttons labeled "marketing button" or "get me an offer" or with some similar label. These buttons may be dedicated solely to the purpose of allowing players to request marketing offers.

(x) The Form of Complimentaries the User is to Receive

The complimentary (comp) system is an important promotional feature at most casinos. The complimentary system allows users to receive benefits based on the user's amount of play. For example, a user might be eligible for a free meal at a casino restaurant for every $3000 gambled at the casino. One aspect of the disclosed invention is allowing a user to choose what types of complimentary benefits he would like to receive. The user may choose, for example, to receive free meals, reduced hotel rates, free show tickets, line passes, cash, credits, or merchandise. Where the user chooses merchandise that a casino does not typically give out, the casino or central controller may order the merchandise for the user. In fact, a significant advantage of the user's remotely choosing merchandise as a complimentary item is that the casino or the central controller has time to obtain the merchandise before the user visits the casino. The user may also disclose his intention to gamble for a certain amount so that the casino or controller can have a better assurance that the user will actually earn enough complimentary points to receive the merchandise the user has designated.

In addition to specifying the form of complimentary items, the user may also specify the amount and the type of play necessary to earn the complimentary items. For example, the user might say that he wants to earn something for playing the quarter slot machines for 6 hours. What follows is a partial list of activities the user may specify as activities that earn complimentary items:

The user plays for a certain amount of time
The user makes a certain number of handle pulls
The user wins a certain net or gross amount
The user loses a certain net or gross amount The user inserts a certain total amount of money The user makes wagers totaling a certain amount In addition to specifying complimentaries for himself, a user may specify them for friends, relatives, or others.

(xi) Gambling Rules

Often, a user has preconceived ideas about what to do with his winnings at a casino, or what to do when he wins, or loses. Too often, a user leaves a casino wishing he had quit when he was up $100, or wishing he hadn't gone to the ATM a second time, etc. Therefore, a user may input rules that will govern his actions at the casino. Remote from the emotions and pressures of the casino floor, the user will better be able to decide how to handle his money.

One set of rules a user might input describes how the user will allocate winnings among various causes. For example, the user may wish to allocate 2% of winnings to pay for his hotel bill, 3% to pay for a credit card bill, 10% to go into a gift fund for his wife, and 3% to go toward his child's college tuition. With these rules in place, the controller may set up multiple accounts for the user, and have the casino server automatically divert portions of the user's winnings to the designated accounts. For example, after a user wins $100 on a handle pull, the casino server may communicate this information to a central controller. The central controller may then increment a user's hotel bill account by $2, credit card payment account by $3, wife gift account by $10, and child tuition account by $3. At predetermined time intervals, the user may be asked (e.g. by the central controller, casino server, or gaming device) whether the money in the designated accounts should actually be used for its intended purpose. Upon the user's approval, money in his hotel bill account may be eliminated, and his hotel bill reduced by the corresponding amount. Similarly, money in his wife gift account may actually be used to purchase a gift (the user may have also designated the gift as part of his rules).

The following are exemplary rules or fragments of rules that may govern the user's allocation of winnings.

A fixed percentage of each payout the user wins goes into one or more accounts. Thus, if a user wins $2 on a handle pull, two cents may be allocated to a particular account.

A variable percentage of each payout the user wins goes into one or more accounts. The percentage may depend on the size of the payout, the time of day, the user's net winnings thus far, the amount already put into one or more accounts, etc.

A portion of a payout goes into an account only upon the realization of some random event. For example, a rule might govern that for every credit a user wins, a random number between 1 and 100 is to be generated. If the number is 5 or less, then the credit goes into a first account. If the number if between 6 and 10, the credit goes into a second account, and so on.

One or more credits is taken out of a user's winnings at fixed intervals. For example, after the user wins 99 credits, regardless of how long it takes, the $100^{th}$ credit is taken out and placed in a particular account for the user. In another embodiment, one or more credits may be taken from a user device at fixed time intervals and placed into a particular account, provided the user has credits on his gaming device.

Other possible rules the user may specify include

The user is encouraged to quit after some condition has been met. The condition might be that the user has lost a certain amount; the user has lost on a certain number of consecutive handle pulls; the user has won a certain amount; the user has played for a certain amount of time; etc. The gaming device may strictly enforce the user-defined rule by, for example, forcibly cashing out the user and ceasing to operate so long as the user's player tracking card is inserted. Alternatively, the user device may simply encourage the user to quit, reminding him that he had intended to quit at this point. The gaming device might also suggest some alternative activities for the user. For example, the user might visit the casino's restaurant, bar, or show. An exemplary input of the user into the Web site of the central controller is, "Cash me out if I win $100 or if I'm down $100,"

The gaming device, casino server, or the central controller manages the user's wagers so that the user does not lose all of his money prior to a certain time. For example, the user might say, "I don't want to lose all of my $100 buy-in within a three hour period." Then, the gaming device might steadily decrease the user's wager size as he loses money, to make sure he does not run out within a three hour period. If the user begins to win money, the gaming device may increase the size of the user's wager.

(xii) Information about Contracts for which the User Wants to Sign Up

Gaming contracts are a way for a user to purchase and for a casino to sell large blocks of handle pulls at once. Over the course of a large number of handle pulls, certain statistics become more pronounced. For example, whereas after a small number of handle pulls, a user may or may not come out ahead, the user is almost guaranteed to come out behind after a large number of handle pulls. This is because the house maintains a small edge on every handle pull. Therefore, in selling large blocks of handle pulls to a user, the casino can afford to provide discounts or other benefits. One attractive benefit is insuring a user against losses. Thus, a user may pay to make 20,000 handle pulls with the provision that he keeps any winnings but is not liable for any losses. Aside from being able to offer attractive incentives for contract purchases, the casino also benefits from locking the user into a large number of pulls.

The user also benefits from contract play. As mentioned, the user may insure himself against losses. The user may also ensure that he can afford a large number of pulls by purchasing them all at once. Then, he needn't worry about running out of money before his planned stay at the casino ends. Another benefit is that, having purchased a large number of handle pulls at once, the user need not necessarily be present when they are executed. Thus, the user may go off to have lunch or may even leave the state while handle pulls are made on his behalf. The user then enjoys an experience akin to that of remote gambling.

In some embodiments of this invention, the user may structure and or purchase contracts at the Web site of the central controller. In structuring a contract, the user may designate any of the following:

The number of handle pulls in the contract

The wager amount for each of the handle pulls

The game to be played (e.g. IGT®'s Triple Diamond®, or Double Bonus Poker®)

The price of the contract

The user may also provide gambling instructions such that a gaming device might generate outcomes for the user automatically. Such instructions may relate to the outcomes of a contract, or to outcomes unrelated to a contract. Exemplary instructions include The frequency with which outcomes are to be generated (e.g. make 10 handle pulls per minute)

The total number of outcomes to be generated (e.g. make 1000 handle pulls)

The way new outcomes are to be generated or new wagers are to be made in dependence on old outcomes (e.g. double up my bets every time I lose, and go back to 25 cents per pull when I win. Or double the rate of handle pulls when I have lost more than five times in a row, but halve the rate of handle pulls when I have won a payout of more than $10. Or stop after I have won or lost $100.)

Once the user has submitted preparation data describing a contract and/or gambling instructions, the user may name or otherwise identify the contract. For example, the user may call a contract "Superluck system." Then, when the user appears in person at a gaming device, he need only select the Superluck system to begin contract play.

(xiii) Travel Arrangement Information

Using the Web site of the central controller, the user may make travel and accommodation arrangements. The user may select, for example, the hotel at which he would like to stay, the days he would like to stay, the grade of room, the transportation he would like to take from the airport, the airline he would like to fly, etc. In some embodiments, the user may provide travel dates and allow the central controller to find a suitable hotel for the user. For example, the central controller might find a hotel with rooms available, a hotel with the cheapest room rates, or a hotel that gives benefits for staying there (e.g. free meals).

The user may receive various gaming related benefits for making travel arrangements using the central controller. For example, he may receive five dollars in free chips for every $100 worth of travel arrangements he makes using the central controller.

(xiv) Friends' Email Addresses

At the central controller's Web site, the user may enter the email addresses of friends, relatives or other people the user may wish to contact during a gambling session. The user may wish to contact people, for example, if he has just had a string of good luck and wishes to share his excitement with others. The user may also wish to contact others to solicit encouragement if he has not been doing so well. The user may also simply want to chat while playing the slots. By entering email addresses remotely, a user has access to an address book, for example, and need not memorize all his friends' addresses. The remotely entered addresses then become available to the user at a gaming device. For example, the name of a user's friend may be listed on a touch screen of the user's gaming device. The user need then only touch the friend's name, compose a message, and touch a "send" button on the touch screen in order to send an email message to his friend. In addition to friends' or relatives' email addresses, the user may enter AOL Instant Messenger® handles, phone numbers, or other contact information for friends.

In some embodiments, the user gives the central controller or one or more casino servers permission to contact one or more of his friends. The central controller may then market to the user's friends by, for example, urging the user's friends to visit a casino associated with the central controller. The user may receive a benefit for allowing his friends to be contacted. In some embodiments, friends are contacted on behalf of the user. For example, the user says, send an email to my friend Joe Smith every time I win more than $40 on a handle pull. The user may even compose the message before hand. The message might read, "I've just won $x, don't you wish you had come with me?"

(xv) The User's Gambling Circle

A user may register one or more other people to benefit from his gambling. These registered beneficiaries are termed the user's "gambling circle". For example, the user registers several friends, each to receive 10 percent of any jackpot the user receives. Creating a gambling circle has several advantages. A user can leave for a trip to a casino with the psychological backing of friends, relatives, or coworkers. When he wins, he not only feels good about receiving money, but also about having won money for his gambling circle. Furthermore, when the user returns from his trip, his gambling circle will be more interested in how the trip went and in any good stories the user has to tell. Describing his trip to his gambling circle adds to the fun of the user's experience.

A user may register members of his gambling circle by entering their names, email addresses, and/or home addresses when logged into the Web site of the central controller. These may be stored in the gambling circle database of FIG. 11. When a user registers members of his gambling circle, he may specify what benefits they are to receive. The following is a partial list of possible benefits:

A percentage of any jackpot the user wins.
A percentage of the user's gross winnings.
A percentage of the user's net winnings.
A percentage of the user's jackpots, net, or gross winnings during a certain time frame (e.g. from 2:00 pm to 3:00 pm every day).
A percentage of the user's jackpots, net, or gross winnings, capped at a certain amount, (e.g. 5% of net winnings up to a maximum of $50).
A non-monetary prize which is dependent on the user's winnings. (e.g. a $50 gift certificate at Amazon if the user wins any jackpot over $1000)

Benefits given the members of a user's gambling circle may or may not detract from a user's own winnings. For example, if the user wins a $1000 jackpot, and has signed up a member to receive 5% of any such jackpot, then the user may receive only $950 of the jackpot. Alternatively, the user may receive the full $1000, and the casino or other party (such as a marketer) may provide the extra $50 due the member of the gambling circle. If it is the casino that will provide the extra money to compensate a member of a gambling circle, then the casino may require some action of the user or the member of the gambling circle before providing the money. For example, the casino may require the member of the gambling circle to pick up the $50 at the casino. The casino would then benefit from having a potential customer visit the casino. A marketer providing the extra $50 might require the member of the gambling circle to test one of the marketer's products. For example, a car dealer might require the member of the gambling circle to test drive the dealer's car before receiving the $50.

In some embodiments, the benefits given the members of a user's gambling circle bear little relationship to the user's winnings. For example, members of a gambling circle may receive benefits only when a user loses in excess of a certain amount. As another example, a member benefits when the user gets an outcome of "lemon-cherry-bar," which may ordinarily be a non-winning outcome.

A member of a gambling circle may receive any benefits due him in a number of ways. The casino may send cash, a check, a money order, a voucher for casino chips, or a prize in the mail. The casino may wire money, send digital cash, or deposit money directly to a financial account of the gambling circle member. The casino may simply notify a member of a user's gambling circle of what the user has won, with the presumption that the member would then collect from the user. Many other ways are possible for a casino or marketer to provide a benefit.

(xvi) Intentionally Information

Knowing a user's intended activities can be valuable for a casino or other marketer. Intended activities may include such things as when a user intends to visit Las Vegas; how long a user intends to stay in Las Vegas; how much a user intends to gamble; where a user intends to gamble; where a user intends to eat; where a user intends to stay; and so on. Knowing a user's intentions, a marketer can try to pitch products or services that suit the user's intentions. For example, if a user plans to stay in Las Vegas for four days, a hotel might offer the user a special rate based on a four-night stay. Also, when the user is in Las Vegas on his last day, a casino may be willing to sell a product to the user. The casino would not ordinarily wish to divert a user's money from gambling. However, knowing that the user is there for his last day, the casino might deduce that a larger profit would come from selling a product to the user than would come from allowing the user to gamble for his small remaining amount of time.

A user may submit his intentions to the central controller via the central controller's Web site. The user may respond to specific questions, such as "Flow many people are you traveling with," by keying in a number or by selecting from multiple answer choices, such as "1", "2", "3", or "more than 3". The user may also provide more free-form answers, either by typing them in or by speaking into a microphone. Free form answers may be responses to questions such as "What do you plan to do during your vacation?" The free form answers may then be interpreted by a human or a computer program.

The user may be compensated for submitting his intentions. For example, the user may receive compensation for each question he answers. The compensation might depend on the value of the user's answers to a casino or marketer. For example, a user may receive more compensation for answering, "What is your gambling budget?" than for answering "Where do you intend to eat for lunch Sunday?"

As the user answers questions, new questions may be posed to the user based on his answers to old ones. For example, if the user says his trip to Las Vegas is to last 4 days, he may then be asked where he plans to stay. However, a user who indicates his trip is only a day trip may not be asked where he intends to stay.

A casino or a marketer may try to influence a user to alter his expressed intentions, perhaps with the offer of a special deal. For example, if the user intends to gamble at a first casino, then a second casino may offer the user $20 in free chips if the user goes there instead. If the user only plans to stay three nights, then a hotel may offer him a discount on room rates for a fourth and fifth night.

A casino or marketer may also encourage a user to commit to his intentions. For example, the user may say he intends to spend about $100 shopping at a particular casino. The casino, knowing the user could always change his mind, might ask the user to commit to the $100 worth of shopping. For committing, the user might receive a benefit, such as a $20 gift certificate at one of the casino's stores. There may be various ways of enforcing the user's commitment. For example, the user may have to deposit a certain amount of money with the central controller. The user may lose the money if he does not honor his commitment.

A user may submit information about his friends' intentions. Perhaps the user knows how long his friends are staying, where they are staying, where they like to gamble, where they like to eat, and so on. The user might provide friends' contact information along with their intentionally data, so that a casino or marketer may contact the user's friends.

Along with information about his intentions, a user may submit information about his obligations. Obligations may be thought of as a stronger form of intentions, where there is some psychological pressure on a user to perform an action. For example, the user is obligated to leave after four days because he has to go to work on the fifth day. A user may similarly receive compensation for submitting obligations. A marketer may not try as hard to get a user to commit to his obligations, nor to convince a user not to fulfill obligations.

The central controller may infer user intentions or obligations. If the user has already made a reservation with a casino's hotel, for example, then the central controller may receive such reservation information from the casino hotel. The central controller then knows how long a user intends to spend on a vacation. The central controller may also refer to existing data about the user. For example, if the central controller has a record of the user's prior hotel stays in Las Vegas, and the user has stayed in Las Vegas for an average of five days during each of the last six years, then the central controller may infer that the user intends to stay in Las Vegas for five days during an upcoming vacation.

Knowing a user's intentions and obligations, the central controller may employ principles of revenue management in providing offers to the user. For example, if the central controller knows a user has a $150 food budget, then the central controller might offer the user a meal at a restaurant for $20. Sam, who has a $500 food budget, might get the same meal offered for $30. The central controller might also offer the user food or products of a perishable nature, perhaps at a reduced price.

(xvii) Entertainment and Convenience Information

Gaming devices may have the capability of providing a number of entertainment or convenience features beyond the mere play of the game. For example, gaming devices may allow the user to view television or movies, to access the Internet, to place phone calls, to do word processing, to listen to music, and so on. Therefore, a user may submit preparation data detailing the entertainment and convenience features he would like. What follows are some examples of user requests:

The user requests continuous access to ESPN® whenever playing the slots

The user requests to place 20 minutes worth of phone calls to any place in t e U.S. per three hour period.

The user requests to watch Conan the Barbarian®, Star Wars®, and the Matrix® while playing the slots The user requests access to the Internet and to Microsoft Word® while at the slots The user requests access to AOL® Instant Messenger® while at the slots The user requests free access to two exclusive Web sites while playing the slots The user request to hear the top 50 songs on the country music charts while playing the slots The user may also request particular entertainment features, including movies and TV shows, for his hotel room.

(xviii) Information about the User's Preferred Environmental Conditions

A user may submit preparation data on what environmental conditions most suit him. The user might provide preparation data pertaining to ambient temperature, ambient lighting, proximity of machines to each other, the crowdedness of the casino floor, the noise level of the casino, and the smokiness and ventilation of the casino. In addition, preparation data may pertain to the number of casino personnel available to serve a user. For example, the user may desire numerous desk clerks to help with the exchange of coins for paper currency. The user may desire a number of waiters and waitresses on hand to bring drinks frequently. Users may specify preparation data that pertains to the user's preferred drink or drinks. Knowing these, a waitress would be able to bring the user drinks without asking what he would like. The user may also submit preparation data about when he would like to be served drinks. Then, a waitress could bring drinks to a user without his ever asking. Users may specify preparation data that pertains to casino devices in a particular configuration. For example, the user might prefer machines that are at the end of a row, that are isolated, or that are in an arc configuration.

(xix) Scrap Book Information

A trip centered on gambling may constitute a major vacation for a user. The average visitor to Las Vegas spends more than four days there. A visitor often comes in by airplane. Furthermore, visitors to Las Vegas seek out numerous forms of entertainment in addition to gambling.

As with any vacation, the user wishes to enjoy himself and to retain memories of his best experiences. A casino may assist a user in retaining memories by documenting the user's experiences in various ways. The casino may use the security cameras to take pictures of the user. The casino may save pictures of the user from various special moments, e.g. just after the user has won a sizable payout. The user's gaming device may communicate with the casino server or central controller, alerting them that a payout has been won. The casino server may then send a signal to a casino security camera overlooking the user. The camera may be instructed to capture and/or save one or more still images from the time period during which the player won. Security cameras may also record images from a user at times of low morale, to serve as a points of comparison with pictures of the user's later triumphs.

A gaming device may also record and store particular outcomes achieved by the user. The gaming device may provide the user with a printed record of his outcomes. The gaming device may also communicate the record of outcomes to the central controller. The central controller may then send the record of the outcomes to the user's terminal. Using software that graphically represents a gaming device, the user may be able to relive his gaining experience on his user terminal.

Pictures of the user's facial expressions may even be overlaid, on top of the graphical representation of the gaming device as it achieved outcomes causing the user's expressions. For example, a user is shown with an elated expression on top of a picture of three bars lining up on a slot machine. Such pictures may be provided, digitally to the user, in printed form, or may be put on T-shirts or other merchandise for the user.

When a user achieves certain outcomes, casino employees may gather around the user for a group picture. Perhaps they hold the user on their shoulders directly in front of a security camera.

The casino may record sounds from the user as well as images. For example, microphones on the gaming device may record the user's exclamations of sorrow or joy as his fortunes change.

Since documentation of a vacation may be on important to the user, the user may submit preparation data describing how his vacation will be recorded. The user may describe when the casino should take or record pictures of the user. For example, the user might say to save a picture of the user whenever the user wins a payout exceeding $100. The user might say to save the top five outcomes won by the user, no that the user may later have the outcomes reenacted at his computer.

The user may wish for special merchandise to be made reflecting the user's vacation. For example, the user may ask for a mug displaying the dollar figure of the user's best outcome above a picture of the user.

Part of the user's preparation data may also be a payment scheme for the documentation of his vacation. For example, the user may pay $10 and be entitled to receive prints of 100 pictures of the user's choice. The user may pay $20 to receive two T-shirts with the user's picture on them. The user's payment may or may not be made in advance. The user may or may not commit to paying for any elements of documentation.

In some embodiments, a user's gaming device is configured to display a "photograph this" button or a "save this" button. When the user presses the button (as by touching an area of the touch screen), a camera in the casino may photograph the user, or the gaming device may save the current outcome for future reenactments.

It may be worthwhile for a casino to provide a user with free documentation of his vacation. After taking multiple pictures of a user, for example, a casino would be able to present the pictures to the user in a logical, organized, or attractive format, such as a scrapbook. However, if a user were to go to multiple different casinos during a vacation, and were he to receive documentation from the multiple casinos, the documentation from the different casinos would not necessarily fit together conveniently. Thus, a casino can retain users more effectively by providing documentation, since a user would wish to stay at that casino and have his whole vacation documented in a unified format.

In some embodiments, multiple casinos, restaurants, and/or other merchants may coordinate with each other in the documentation of a user's trip. For example, two different casinos may each photograph a user, and send the photographs to a central database maintained by the central controller. The central controller may then assemble all of the photographs into an album and present them to the user in a unified format.

Photographs, outcomes, and other data documenting a user's trip may be stored in a trip documentation database 210.

(xx) Who the User Wishes to Buy

Many visitors to casinos enjoy shopping in casinos' extensive shopping malls. However, the malls do not necessarily have everything a user wishes to purchase. Therefore, the user's preparation data may include a list and description of items the user wishes to purchase. The user may desire customized items, such as T-shirts with his name on them. When the user indicates what items he wants in advance, stores have the opportunity to obtain or to make what the user wants. The user may pay in advance or may simply commit to a purchase. The items the user requests may be held at particular stores, may be sent directly to the user at his home address, or may be brought to the user while he is at a gaming device or in his hotel room. In some embodiments, a store obtains goods requested by the user and gives them to the user at the store for free or for a steep discount. The expectation is that the user will purchase more items at the store. The user may be required to purchase more items in order to get the requested product for free or at a discount.

Items a user requests to purchase may also be offered to the user as prizes. For example, if the user wins a $200 prize at a slot machine, the slot machine may offer to give the user the dress she requested instead of her prize.

Clearly a tremendous amount and variety of preparation data is possible, and a user may not necessarily provide certain preparation data that it is possible to provide. For example, a user may not necessarily provide any data of use to marketers, nor even indicate whether or not he would like to receive marketing offers. Thus, the controller 102 may associate default preparation data with each user. In the above example, where the user has not indicated whether or not he'd like to receive marketing offers, the default may be that the user does receive marketing offers. Default data may not be the same for every user. Rather, default preparation data may depend on information about the user, or it may depend on the business environment of the central controller, casino servers, or marketers. For example, marketing offers may be presented to a user if a marketer is experiencing particular pressure to dispose of inventory, but may not be presented otherwise.

2. Step S2: Determining an Associated Preparation Code

In some embodiments, the central controller 102 may assign a preparation code to each user's preparation data. The code may be any sequence of letters, numerals, punctuation, and other symbols. Sample codes are, "123456," "C123456," "ABCDEF," and "*$%#@Q%." Codes may be any length. In some embodiments, codes are limited in length and symbol usage so that they may be easily memorized by a human. Also, the symbols in codes may be restricted to those easily entered into a gaming device. For example, a player tracking card reader on a slot machine may contain a keypad with only numerals. Therefore, codes may consist strictly of numerals.

In some embodiments, a unique code is assigned to each unique set of preparation data. Since there may be more possible sets of preparation data than codes of a given length, certain codes may expire after a time so that they may be reused for new sets of preparation data. That is, code "123456" may correspond to a first set of preparation data only for three weeks, after which it may be assigned to a new set of preparation data. A code may correspond to different sets of preparation data depending on different circumstances. The time of day, the geographic location, and the type of gaming device receiving the code may all determine the corresponding set of preparation data. Advantageously, this may allow fewer codes to represent more unique sets of preparation data, since each code can now represent multiple sets of preparation data. For example, "123456" may represent a five reel, $1 per bet gaming device configuration in Atlantic City, but may represent a three reel, quarter per bet configuration in Las Vegas.

When codes are assigned to sets of preparation data, the codes may simply be assigned in sequence according to the order in which sets of preparation data are defined by users. For example, set of preparation data may be assigned the code "000129," while a set of preparation data received immediately afterwards may be assigned the code "000130."

When a code is assigned to a set of preparation data, a record may be created for the code and preparation data in a database such as that of FIG. 12. When a gaming device, casino server, or the central controller later receives a code, it may simply examine the record in the database to determine the corresponding preparation data.

In an alternative embodiment, a code actually contains preparation data. For example, each digit of a code may correspond to a different feature of a gaming device configuration. The first digit may indicate the game type, the second the font size, the third the wager size, and so on. Then, when a gaming device receives a code, it need only interpret each segment of the code using a predefined table in order to configure itself properly. Such a table may be stored in the gaming, device, the casino server, or the central controller.

In some embodiments, a first code is created such that it contains preparation data. However, the code may be very long, especially if there are many features that can be customized. Therefore, a second code is created by compressing the first code in some fashion. Numerous compression algorithms for a sequence of bits or numerals are known in the art.

When the gaming device later receives the second code, it may reverse the compression algorithm to recover the first code and to deduce the preparation data from the first code. Of course, the casino server or central controller may also reverse the compression.

Preparation data may be associated with a particular user. Thus, information about the user may be sufficient for a gaming device to obtain preparation data. For example, a user's name may be stored in a database corresponding to a set of preparation data. When the user later enters his name into a gaming device (perhaps via his tracking card), the gaming device may find the user's name in the database and thereby obtain the corresponding preparation data. A user's player tracking card number may serve a similar function. Other user characteristics may be associated in a database with configurations. A user's biometric data, such as voice data, retinal scan data, or finger print data may be associated with a particular configuration.

A preparation code may take the form of bar code, or any other machine-readable code. The user may then print out the bar code from his user terminal. When the user subsequently inserts the bar code into a gaming device, the gaming device may obtain the user's preparation data.

A user may specify his own code to be associated with a particular configuration. Perhaps he labels a configuration, "203-161-9999," or "Big Jackpot," or "xyz."

A preparation code may only describe particular features that a user has selected. Other features may then take on default values. For example, if a user has only selected the number of reels, a code might read "NR5," where "NR" stands for "number of reels," and "5" indicates the desired number. The code does not describe other features, and so these may take on default values.

3. Step S3: Transmitting the Preparation Data and Code to a Casino Server

Once a code has been associated with a particular set of preparation data, the code and the preparation data may be transmitted to a casino server, and/or a gaming device. Transmission may occur via the Internet, email, phone, fax, or any other mode of communication.

In some embodiments, the code and preparation data are transmitted immediately after they have been generated. In other embodiments, a gaming device may only receive preparation data after a user has entered a code, and the gaming device has sent the code to the casino server and/or the central controller.

In embodiments where a preparation code contains information about a gaming device configuration, the controller need not necessarily transmit both configuration data and the preparation code, since a gaming device or casino server may be able to derive one from the other according to predefined rules.

When a user sits down at a gaming device, he may enter his preparation code in order to have the gaming device assume the user's preferred features. He may enter the code in a number of ways including:

Keying in the code via a keypad or touch screen
Speaking the code into a microphone, whereby it is interpreted using voice recognition software
Inserting a bar code into the gaming device
Inserting his player tracking card into the device
Inserting into the gaming device any magnetic strip containing the code
Inserting into the gaming device a floppy disc, CD, DVD or other storage medium containing the code Wirelessly transmitting the code to the gaming device using a cell phone, PDA, or other communications device If the gaming device cannot interpret the code, the gaming device may transmit the code to the casino server and/or to the controller. The casino server or controller may then look up the code in a database such as that of FIG. 12, and may retrieve the corresponding configuration information. The configuration may then be sent back to the gaming device so that it can configure itself accordingly.

4. Step S4: Provide Feedback to the User

After the user has entered preparation data into the Web site of the central controller 102, the central controller 102 may respond to the user. The following is a partial list of possible information contained in the central controller's response:

- A thank you to the user for submitting preparation data
- Maps and directions to any gaming devices or other points of interest for the user
- Vouchers or coupons for use at a casino, restaurant, or other business. The vouchers may, in particular, be for businesses in the vicinity of the user's intended destination.
- Information about one or more individual gaming devices. For example, the gaming device's date of manufacture, pay out percentage to 53 year-old males, etc. The user may, for example, print out this information and take it to his astrologer for a consultation.
- Updates on gaming devices for the time since the user entered preparation data. The central controller may call the user's attention to new gaming devices if these have been performing well lately.
- Configuring a gaming device according to the configuration data associated with a preparation code received from a player at the gaming device.
- Marketing offers for the user. The marketing offers may offer the user benefits for doing business or agreeing to do business with any merchant in the vicinity of the user's destination or anywhere else. In some embodiments, the central controller will only honor the user's preparation data if the user agrees to a marketing offer. For example, the controller might say to the user, "Sure we'll give you the pay table you requested, but we'd like you to fly to Las Vegas using XYZ Airlines," The central controller might ask the user to prepay for some product or service in order to solidify the user's agreement. So the user might prepay for three nights stay at a hotel after agreeing to spend his vacation at the hotel.

F. EXAMPLE ILLUSTRATIVE EMBODIMENTS OF THE INVENTION

The following very specific examples are provided to illustrate particular embodiments of the present invention, particularly from the perspective of potential users of the system 100A, 100B including players and potential controller 102 operators such as casinos.

1. Example A

Sarah wanted to keep her brother informed during her upcoming trip to Las Vegas. She therefore logged onto the Web site Vegasvacation.com and provided her player tracking card number. She then provided instructions that all outcomes she achieved would be emailed to her brother once an hour. She provided her brother's email address.

The day Sarah arrived in Las Vegas, she sat down at a slot machine. She inserted her player tracking card. The slot machine communicated the player tracking card number to the central controller. The central controller looked up the number in a database, and found the instructions Sarah had provided, along with her brother's email address. The central controller then instructed the slot machine to transmit its outcomes to the central controller as they were generated. As Sarah made her handle pulls, the slot machine transmitted the outcomes to the central controller. The central controller stored the outcomes. Every hour, the central controller sent the newly stored outcomes in an email to Sarah's brother.

2. Example B

Sam was planning a week-long trip to Las Vegas. Sam did not get much time away from his home in Florida due to work and family obligations. So this would be his big vacation for the year. He wanted it to be memorable and he wanted it to go well.

Sam began his planning by logging onto the Web site, http://www.Vegasvacation.com. He saw that there were many of aspects of his vacation for which he could plan. He set up an account with the Web site by typing in his name, age, email address, and home address.

First Sam decided to find a slot machine game he was comfortable with. He selected from a list of possible slot games, choosing a game called Crazy Jewels. A new window appeared on his monitor, containing a graphical rendition of a mechanical three-reel slot game. Sam clicked on a "spin" icon and caused the graphical slot machine to spin and display an outcome. Sam made a few more spins before deciding Crazy Jewels was boring, and trying a new game. Sam tried a few different games before finding one he enjoyed playing. The game was called Camel Quarters. He enjoyed it in part because he seemed to be winning most of the time. Sam put a check mark next to Camel Quarters on the Web site.

One of Sam's fears was losing too much money on his vacation. He knew he could try to limit his gambling budget, but if he lost it all quickly, he would be bored for the rest of the vacation. Therefore, Sam browsed through some marketing offers on the Web site. Many merchants offered to offset gambling losses, or to give Sam money outright for doing business with them. Sam agreed to an offer where he would test drive a sport utility vehicle in return for $30, which Sam would get only if he lost at least $30. Sam agreed to several other offers too.

In case the marketing offers Sam accepted did not turn out to be enough, Sam decided he would be open to receiving more marketing offers while playing the slots. He entered some information about himself, including the fact that he owned a house, had two small children, had a three-year old car, and enjoyed golf. A marketing button would then appear on the touch screen of any slot machine Sam played. Anytime Sam wished to receive more money, he could press the button and receive another marketing offer. Accepting the offer would give Sam more money to gamble with.

On the Web site, Sam had the opportunity to choose a prize he would like to play for at a slot machine. Sam had always wanted a Porsche™, so he chose his favorite model to play for. If Sam then won the maximum jackpot on any machine with a jackpot over $30,000, he would get the Porsche instead of the money.

Sam noticed that the Web site allowed him to scan in pictures to be subsequently displayed on his slot machine. Sam thought it would be neat to have his dog Woofie appear on the reels of the slot machine. Sam could even arrange it so that lining up three Woofie's would give him a large payout. So Sam scanned in a picture of Woofie using his home scanner. He sent the picture as an attachment in an email to Vegasvacation.com. The picture was then stored in a database for later access by Sam at a slot machine.

Sam saw that he could actually have pictures taken of him while playing the slots, and that the pictures could be made into an album for him and sent to him for only $20. Since this was a big vacation for Sam, he very much wanted the vacation documented. Therefore, Sam typed in his credit card number and agreed to pay the $20. He asked that pictures be taken of him whenever he won more than a $100 pay out. He also asked that his picture be overlaid on top of an image of the slot reels for any pay out over $500.

When Sam had finished with his selections at the Web site, he was asked to enter his mother's maiden name, and the name of the street on which he grew up. The answers would later be used in confirming Sam's identity at a slot machine. Sam did as he was asked.

The Web site then gave Sam two links to maps. Sam clicked on one link and a map of Las Vegas appeared on his screen. The New Age Casino was highlighted on the map. The other link gave Sam a map of the casino floor of the New Age Casino. Two rows of slot machines were highlighted. These were the machines that played Camel Quarters. Sam printed out the two maps so he could find his way to the Camel Quarter machines.

When Sam got to Vegas, he took a cab to the New Age Casino. Using his map of the casino floor, he easily found the Camel Quarter slots. He sat down at one. The touch screen displayed a question, asking whether Sam had made any advance customizations. Sam touched a "yes" button and was asked for his name. Sam entered his name using touch screen keys. He was then asked for his mother's maiden name and for the name of the street on which he grew up. He answered these questions successfully, and was then welcomed. To his delight, the picture of his dog Woofie appeared on the touch screen. Woofie subsequently appeared on the reels of the Camel Quarters game.

An hour into play, Sam had lost $30. A message appeared on his touch screen. "Bob's SUN Dealer is pleased to take care of your loss. Here is another $30." The credit meter on Sam's machine then incremented by $30. Unfortunately, in the next few hours, Sam exhausted all the money he had on reserve from marketers. So he pressed a button on his touch screen marked "Get Your Offer to Increase Your Bankroll!" Sam was then offered $25 for trying a free round of golf at the Golden Days Country Club in his hometown. Sam agreed, signed an area on the touch screen, and watched as his credit meter incremented by $25.

On his second day, Sam lined up three Woofie's and won $250. He was told to look up at the ceiling, where a security camera captured his smile. His face was overlaid atop an image of three Woofie's, and this picture was the highlight of the album he later received.

G. ADDITIONAL EMBODIMENTS

The following are example alternative variations which illustrate additional embodiments of the present invention. It should be understood that the particular variations described in this section can be combined with the different embodiments, or portions thereof, described above in any manner that is practicable. These examples do not constitute a definition or itemization of all possible embodiments, and those skilled in the art will understand that the present invention is applicable to many other embodiments. Further, although the following examples are briefly described for clarity, those skilled in the art will understand how to make any changes, if necessary, to the above-described apparatus and methods to accommodate these and other embodiments and applications.

The submission of preparation data has been described in the context of a gambling experience. However, a user could also submit preparation data to customize a video game experience. For example, prior to visiting a video arcade, a user could select a game, a sound level, a sensitivity level of characters' motion in relation to the movement of controls, and so on. A user could submit preparation data to customize his experience at an ATM machine. Then, after entering his password, the user might immediately receive a designated amount of cash. Having submitted preparation data, the use need not select a language, select deposit or withdrawal, select checking or savings, key in a number, etc. Preparation data may also apply to a point of sale terminal. When a shopper identifies himself using a frequent shopper card, or a credit card, the POS terminal may respond to the shopper's stored preparation data. The POS terminal may then format the shopper's receipt in a certain way, print certain coupons on the back of the shopper's receipt, or present certain marketing offers to the shopper. In some embodiments, preparation data includes a description of a subscription to a product or service. The user may, for example, indicate he wishes to buy milk once a week for 12 weeks at a discount of 10 cents per carton. Then, when the user pays for milk at a point, of sale terminal, the user is given the 10 cent discount.

Many alternate systems are possible for the present invention. For example, the central controller may communicate directly with gaming devices, without the intermediation of slot servers. The central controller may additionally function as a slot server. Marketer devices may not be present. For example, in some embodiments, the central controller only markets items for sale at the casino in which the controller is situated.

The central controller may inform the user that a benefit, such as free credits, is waiting for him at a particular gaming device. The user need then only insert his player tracking card, or provide some other identifier, in order to claim the benefit. Advantageously, the user is encouraged to appear at a location where he is very likely to gamble. Therefore a casino may be able to afford providing the free benefit as an inducement to gamble.

A user may arrange to have customized coin racks with his name on them made available to him at the casino. The user may also request other customized products, such as T-shirts or mugs, containing names, phrases, or pictures of his choice.

The central controller may be in communication with multiple casino servers. Knowing a user's intentions to visit Las Vegas, several casinos may wish to attract the user to their hotels. Therefore, casinos may compete for the user's business. For example, a first casino may offer the user an enticing package involving discounted room rates, free show tickets, free meals, gambling credits, etc. A second casino may offer its own enticing package. The user or the central controller may then decide which package is best.

Documentation of a user's gambling experience may be sufficiently entertaining as to warrant broadcast on television. On the Web site of the central controller, the user may consent to the user of his voice and/or image for public broadcast. The user may later receive a reward if excerpts from his trip are ever aired.

A user may submit requests for particular meals. The central controller may inform a restaurant so that the chef knows how to prepare the user's meal. The restaurant may also have the opportunity to obtain special ingredients in advance of the user's coining.

Preparation data may include a desired arrangement or lay out for a hotel room. The user may want windows facing a certain direction, silk linen, certain types of food and drink in the room's mini-bar, a certain type of shampoo, and so on.

Preparation data may include what movies or television shows a person wishes to watch at a slot machine. For example, the user may wish to catch up on all of the missed episodes from the last season of his favorite sit-com. The central controller or casino may then obtain these shows and broadcast them on the user's slot machine.

Preparation data may include special medical needs of the user. The user may need a wheel chair, walker, oxygen supply, or an assistant while staying at the casino. The user may request that medication be made available for the user, should the user need it. For example, if the user is diabetic, the user may request that the casino have extra insulin on hand just in case the user needs it. The user may request that he be monitored especially closely by the casino security cameras, so that if he requires medical assistance, it will be made quickly available.

Preparation data may be associated with a credit card account. When a user makes a purchase using a credit card, the user may receive certain benefits described in the user's preparation data. For example, the user may ask to receive 2 cents towards the purchase of a new boat for every dollar purchased using the credit card. The user's money accumulated towards the new boat may be kept in a special account by the credit card company, and released to the user when he has enough to buy the boat. As another example, the user may receive a special discount on a purchase if a credit card order totals over $50.

On the Web site of the central controller, the user may wish to find the worst performing slot machines at a casino or other location, as well as the best performing. Many users believe that poorly performing machines are due for an upswing in performance.

The user may configure his gaming device to allow him to order drinks or other services or products. He may then simply press a "bring drink" button on his touch screen to get a waitress to bring him a beer, for example.

A user may arrange for speed dial buttons in his hotel room. For example, on the Web site of the central controller, the user arranges for a first button to call a pizza restaurant, for a second button to call work for a third button to call home, and so on.

A user may arrange for direct-dial use of his long distance provider. This might save the user from having to dial an 800 number, enter a pin code, and enter a credit card number in order to user his long distance provider.

A user may remotely watch games being played. Watching others play games may allow the user to feel more comfortable playing the games himself. A user might, for example, see a video feed from the security cameras above a blackjack table. He could then watch other people playing blackjack. For reasons of privacy, the user might view only the cards and the dealer, not the faces of the other players at the table.

A user might arrange to borrow various items, including rental cars, digital cameras, cell phones, suits, and so on.

A user might reduce or eliminate charges on his hotel bill prior to embarking on a vacation. To do so, a user might accept marketing offers. For example, the user may make a purchase at an on-line retailer affiliated with the hotel. The retailer might then cover the cost of the user's first night stay at the hotel. The user might also enter into forward commitments. For example, the may commit to staying at the hotel in the future, and thereby get billed for a smaller room than that in which he is to stay.

A user might find out about the machines on which his friends have played. The player may discover the identity of the machines, or even the results his friends achieved on the machines. The user might then play on machines that have done well for friends, or may even try to outdo friends on certain machines. The user's friends may have already been registered as part of the user's gambling circle. Thus, the user does not invade their privacy by looking up their results.

A user may arrange for his constantly updating itinerary to be sent to friends or coworkers. Then, if the user changes plans during a vacation, his coworkers would still know how to reach him.

The present invention may include the additional step of verifying that the player is legally permitted to gamble. For example, if the player is unable to prove he is over the age of 18, he may not be permitted to access the customization Web site. Thus, the central controller 102 may, for example, consult a database of publicly available birth records. Alternatively the player may be required to provide a scan or a photograph of an ID, such as a driver's license or passport belonging to the player. Further, if the player possesses a certain item, such as a credit card, that, for example, is known to only be distributed on a restrictive basis, then the central controller 102 may infer the player's eligibility from the player's possession of the item.

In some embodiments, the remote controller may be equipped to print a generic or customized document describing the player's customized configuration and/or the customization code to enter into the gaming device. The document may include cashless gaming receipts or coupons with bar codes, for example, to provide the player with an incentive to bring the document with him to the casino. The consumer may insert the document, or a copy of it, into the gaming device to activate the customization of the gaming device and/or to redeem the coupons.

In some embodiments, a player device 512, such as a wireless PDA, may be used to activate the customization of the gaming device and it may alert the gaining device to the player's proximity using, for example, a wireless protocol (such as Bluetooth as described at http://www.bluetooth.com/dev/specifications.asp). Once identified, a consumer's customized configuration information may be automatically transferred to the gaming device. Alternatively, the device may be preprogrammed to be able to transfer an ID (e.g. player tracking information), a customization code, and/or an entire configuration to a gaming device, kiosk, or a slot server at the casino location. For example, a player may load a slot machine customization program onto his combination cell phone/PDA (such as the Kyorcera SmartPhone® Model No. 6035). After having created a configuration for a slot machine, the player may walk around a casino "beaming" (via infrared transmissions) his configuration at slot machines. Gaming devices compatible with the system of the present invention may respond by lighting up and/or by playing audio welcoming the player by name and inviting the player to play "his" personally customized game. As indicated above, using a device that supports wireless protocols such as Bluetooth would eliminate the need to actively beam a player's configuration. By merely approaching an enabled gaming device, the player's device could trigger the gaming device to configure itself to the player's customized configuration. The cell phone/PDA may track and record the player's performance and winnings information for a given configuration and allow him to make adjustments to the configuration or entirely new configurations.

In some embodiments, the player may log onto the casino server 112 directly, bypassing the central controller 102.

Alternatively, the player could log onto the gaming device directly, bypassing the casino server 112.

Although the system of the invention has been described as one or more gaming devices 120 networked to a casino server 112, the invention applies to other games and gaming environments. For example, the invention may be applied to table games, such as table poker and blackjack. In such embodiments, players may insert their player tracking cards into card readers corresponding to seats around, for example, a poker table. The casino server could access player preferences data and casino preferences data for the players, and transmit that data to a data terminal located at the dealer. The dealer could then modify the game or award payouts according to the preferences.

The present invention also applies to other environments or systems involving one or more data terminals networked to a central server to configure the terminals to identifiable users or operators. For example, the invention could be readily adapted to apply to networked video game systems, systems with point-of-sale terminals, and automatic teller machines (ATM). This eliminates the need for users or operators to manually enter configuration information during each and every session to configure the terminals.

In some embodiments, the preparation data received by the central controller 102 may be forwarded to one or more slot machine manufacturers to be incorporated into newly manufactured gaming devices. For example, if the vast majority of players prefer larger font types, new machines might be designed with larger font types as a default.

The central controller's Web site may serve as a testing ground for new games. Device manufacturers, or casinos may present games or configurations that they are considering introducing, but for which they desire player feedback. Players may test the configurations, and rate them. Players may be paid or may receive other special privileges for doing so.

Once a player has selected a configuration, the central controller 102 may provide guidance to the player as to how to find gaming devices 120 capable of supporting the configuration. The central controller 102 may illuminate a path through a casino location and/or display a map showing visually where the player might go to find the gaming devices 120. The map might be large scale, showing, for example, the entire world, the U.S., or a particular state. The map might show smaller regions, such as the city of Las Vegas, or even the floor plan of a particular casino location. The map might contain other information such as how many of the desired gaming devices are in each region, how many are currently available, how many are likely to be available, how well they have paid out, and so on.

In alternative embodiments, information regarding a player's gaming experience at the customized gaming device 120 may be transmitted up to the casino server 112, or the central server 102 and the player may be given a code that he can use to later access the information from his user terminal 106. For example, if a video recording of a player winning a jackpot is captured by a camera and recorder in or near the gaining device 120, the gaming device 120 can provide the player with a code that allows him to access the casino server 112 to view the video at home via his user terminal 106. Other types of information that may be transmitted include gambling performance statistics, records of outcomes generated by the gaming device during the player's use of it, account information, customized configuration performance data, records of player decisions made during play (e.g. in video poker devices), analysis of player gambling performance, comparative data from other players, and the like. In some embodiments where targeted marketing information is presented to a player at the gaming device 120, there may be feedback or survey responses from the player that may be stored on or communicated hack to the gaming device 120, casino server 112, central controller 102, and/or the third-party service provider server 118. This type of information may also be made accessible via a code provided to the player, the casino, and/or a third-party.

The following subsections detail additional and alternative embodiments of methods of the present invention.

(i) Receive Configuration Data from a User Terminal

A player logs on to the central controller 102 with the user terminal 106 and communicates his configuration data. The user terminal 106 may include a personal computer, personal digital assistant, a telephone, a kiosk, an ATM, a slot machine, a vending machine, etc. The central controller 102, may include a Web site accessible via the user terminal 106, wherein the user may select a number of customization options for a gaming device 102. By customizing a gaming device 120, a user has the opportunity to select a game he likes. He also has the opportunity to pre-configure a gaming device to operate in a manner that is convenient and pleasing to his senses. For example, the user may pre-configure the gaming device 120 to print text in his native language. The user may set the decibel levels of a gaming device's sound effects so that they are neither too loud nor too soft. Some other possible customizations include configurable features such as: type of game played (deuces-wild, jacks or better, video reel, etc.), speed at which the reels spin, number of coins played as a default (game denomination), game rules, game variations, music level of the game, sounds types generated by the game, game colors, game lighting, amount of help offered by the game, frequency with which bonus levels are reached, duration of bonus levels, whether or not the top jackpot is paid as a lump sum or installment, whether or not team members receive a bonus when the player hits a payout, format of the complimentary benefits received (e.g. cash, merchandise, frequent flyer miles, etc.), payout structure (e.g. 6 coins for a flush and 9 coins for a full house, rather than 5 coins for a flush and 10 coins for a full house), extra payout options (e.g. small payment for four card straight flushes), language or choice of currency, starting point of game (e.g. always start with two pair or three card royal), automatic player decisions (e.g. draw one card to a flush unless there is a pair of jacks or better, in which case the jacks are held). In addition to the features that are chosen by the players, the casino may also set numerous parameters for the player such as: hold percentage of the machine, rate at which complementaries accumulate (e.g. 2% of coin-in rather than 1%), game eligibility (e.g. games which lock out play from anyone but high-rollers), and complimentary award rules (e.g. one player gets a bottle of wine sent to his room if he ever loses more than $1,000 in one hour, while another player gets a free spin every time he misses a one card draw to a royal flush on any deuces wild machine).

There are many possible ways in which player might select customizations. A Web site on the central controller 102 may display multiple menus, each menu providing choices of embodiments for a particular feature as depicted in FIG. 4. For example, a language menu may have the choices of English, Spanish, Chinese, or Japanese. A font size menu may have the choices of large, medium, or small. Menus may also have an "other" choice, allowing a user to select from less common choices (e.g. Swahili) or to key in their own choices, such as a particular point size for font.

In some embodiments, rather than making choices on Web site residing on the central controller 102, a player may download to the user terminal 106 (or a player device 512) software allowing for customization. The software may guide the player through a series of feature menus and store and/or upload the player's selections.

In some embodiments, the player may select features over the phone by, for example, listening to a pre-recorded menu of feature choices and then pressing a number on the phone's keypad corresponding to the desired choice. For example, the player may press "5" to select a five-reel slot game when asked to select a preferred number of reels. The player may press "0" to select a million-dollar jackpot when asked to select a preferred jackpot size. The player may also select features not on any prerecorded menu by keying in a relevant sequence of numbers. For example, the player may key in "175000" to select a maximum jackpot of $175,000, even when there is no pre-recorded choice for a $175,000 jackpot.

In some embodiments of the present invention the player may choose from a number of previously customized configurations. For example, one configuration might describe a quarter denomination, five-reel video slot machine, with standard symbols, three pay lines, and a four-coin maximum wager. The player may choose this configuration in its totality without having to individually choose the coin denomination, the number of reels, etc. In fact, anytime a player customizes a gaming device 120 configuration, the configuration may be listed on the central controller's Web site for another player to select. Of course, once a player selects a configuration, he may be free to change individual features.

Configurations listed on a central controller's Web site, or anywhere else, may have associated performance indicators. For example, a player may report that using "configuration #329", he won $2000, Seeing the high performance of configuration #329, another player may choose to select it for himself. Performance may be indicated using dollar figures, varying numbers of stars, colors, votes, etc. For example, five stars, gold, and 10,000 votes may all be indications that a particular configuration has performed well. Performance may be self-reported by players, or may be reported automatically by a gaming device 120 once a player has finished a gambling session using a particular configuration. Players may also self-report with gaming devices 106 providing occasional verification of the accuracy of players' reports. Individual players may gain reputations as experts at configuring gaming devices 106. Their advice and their configurations may be sought after. Players therefore may have their own ratings indicated by dollar figures, stars, colors, votes, etc.

Use of certain configurations may intentionally be restricted. This may be done to limit the number of players attempting to play on gaming devices 106 that are of a limited quantity within the casino. Additionally, use of certain configurations may be intentionally restricted because only a certain number of gaming devices 106 at a given casino location may be capable of supporting those configurations. For example, a mechanical slot machine will be unable to support video features. If too many players were to select a particular configuration, or even a particular feature, some might have difficulty locating an available machine to support their configuration. Configurations may be made more widely available by allowing players to select times, dates, and geographic regions for their gambling activities. Then, players gambling at different times or in different places need not compete for the same machines to support like configurations.

Another reason that the use of configurations may be intentionally restricted is that being the only one, or one of only a few players to "own" a particular configuration may be psychologically pleasing to a player. Therefore, other players may be restricted from viewing or using his configuration. It is possible that a first player would pay another player for access to his configuration. A player might also pay the central controller for access to a configuration, or for information about high performing configurations. Particular casinos, or particular device manufacturers may enjoy exclusive rights to certain configurations, even when other casinos or manufactures would be technically capable of supporting the configurations. A player who desired to use a certain configuration may then have a reason to play at one casino over another.

While selecting various features or configurations in some embodiments, a player may have the opportunity to test the configurations using the user terminal 106. For example, when the player selects a symbol-size, he may view symbols on his user terminal 106 at the size they would actually appear on a gaming device. When the player selects a reel-speed, he may view graphical reels spinning at the same speed they would on an actual gaming device.

In some embodiments, the user terminal 106 may display a comprehensive or complete graphical representation of a gaming device 120 to aid in the selection of feature values. As outcome generation is simulated, the player may change various features using graphical interface controls, i.e. by clicking, dragging, or otherwise selecting certain areas of the graphical representation of the gaming device. For example, suppose the reels are spinning on the user terminal's display screen. The player may take his mouse and drag it downwards along the surface of a spinning reel, much as a person might drag his hand along the wheel of a bicycle to make it spin. The effect would be to increase the speed of the reel's spinning. The player may change the symbol size by clicking on a corner of a lemon symbol, for example, and dragging the corner away from the center of the symbol, causing the entire symbol to enlarge. A player might create an extra reel by clicking on one reel and dragging it right, creating another reel. Alternatively, the player might click on a reel and use a copy and paste function, much like those found in many word processing programs. Of course, there are many other ways for a player to interact with a graphical representation of a gaming device in order to customize feature values.

A graphical representation of a gaming device 120 also allows a player to engage in mock gambling sessions using his selected configuration. If one configuration does not win for the player in a mock session, the player may choose another configuration. He may keep choosing different configurations until he has found one he considers lucky.

In some embodiments, a player at a gaming device 120 may be an attractive marketing target for a number of reasons. First, the player is typically a captive audience, with eyes fixated on the game at hand. Secondly, a marketer may have advanced knowledge about the player from a player's player tracking card. This allows a marketer to better target advertisements and offers to a player. Third, the gaming device gives the marketer an opportunity to provide immediate benefits to a player in exchange for his attention or his business. These benefits might take the form of cash, gambling tokens, extra bonus symbols, etc. Fourth, the player may be highly motivated to accept from the marketers the offered benefits and their associated conditions. The player may, for example, have suffered a large gambling loss and wish to recover the loss by accepting a marketing offer. Fifth, a player can make payment at a gaming device 120.

Since gaming devices are an ideal place for marketers to make pitches to players, players may provide advanced guidance to potential marketers. The player may answer questions about his age, marital status, financial status, number of children, home ownership, car ownership, medical conditions, and so on. He may indicate the types of products in which he is interested. For example, he may mention that he is looking to have his roof re-shingled, or that he is looking for a new life insurance policy. Player supplied information is a way for a player to customize the ads and the offers he will receive, much as he also customizes the operation of the gaming device. Once the player has received various promotions and had a chance to respond or ignore them, the central controller 102 might update a user profile based on his responses. Analysis of the player responses may allow for better targeting of promotions in the future towards that player.

(ii) Determine an Associated Preparation Code

The central controller 102 assigns a preparation code to each gaming device configuration. The code may be in the form of any sequence of letters, numerals, punctuation, and other symbols. Examples of codes according to the present invention include, "123456," "C123456," "ABCDEF," and "*$%#@Q%." Codes may be of any length. In some embodiments, codes may be limited in length and symbol usage so that they may be easily memorized by a player. For example, the player's telephone or social security number may be used. Also, the symbols in codes may be restricted to those easily entered into a gaming device 120. For example, a player tracking card reader on a slot machine may contain a keypad with only numerals. Therefore, codes for that machine may be limited to numerals.

In some embodiments, a unique code may be assigned to each unique configuration. Since there may be more possible unique configurations than codes of a given length, certain codes may expire after a time so that they may be reused for new configurations. That is, code "123456" may correspond to a first configuration only for three weeks, after which it may be assigned to a new configuration. A code may correspond to different configurations depending on different circumstances. For example, the time of day, the geographic location, and the type of gaming device receiving the code may all determine the corresponding gaming device configuration. Advantageously, this may allow fewer codes to represent more unique gaming device configurations, since each code can now represent several device configurations. For example, "123456" may represent a five reel, $1 per bet configuration in Atlantic City, but may represent a three reel, quarter per bet configuration in Las Vegas.

When codes are assigned to configurations, the codes may simply be assigned in sequence according to the order in which configurations are defined by players. For example, a first configuration may be assigned the code "000129," while a configuration received immediately afterwards may be assigned the code "000130."

When a code is assigned to a configuration, a record may be created for the code and the configuration in a database such as that of FIG. 8. When a gaming device 120, casino server 112, or the central controller 102 later receives a code, it may simply examine the record in the database to determine the corresponding configuration.

In alternative embodiments, a code may actually contains configuration information. For example, each digit of a code may correspond to a different feature of a configuration. The first digit may indicate the game type, the second the font size, the third the wager size, and so on. Then, when a gaming device 120 receives a code, it need only interpret each segment of the code using a predefined table in order to configure itself properly. Such a table may be stored in the gaming device 120, the casino server 112, and/or the central controller 103.

In some embodiments, a first code is created such that it contains configuration information. However, the code may be very long, especially if there are many features that can be customized. Therefore, a second code may be created by compressing the first code according to a compression algorithm. Numerous compression algorithms for a sequence of bits or numerals are known in the art. When the gaming device 120 later receives the second code, it may reverse the compression algorithm to recover the first code and to deduce the configuration information from the first code. Of course, the casino server 112 or central controller 103 may perform the function of reversing the compression.

A particular configuration may be associated with a particular player. Thus, information about the player may be sufficient for a gaming device 120 to obtain configuration information. For example, a player's name may be stored in a database corresponding to a particular configuration. When the player later enters his name into a gaming device 120 (perhaps via his player tracking card), the gaming device 120 may find the player's name in the database and thereby obtain the corresponding configuration. Other player characteristics may be associated in a database with configurations. A player's biometric data, such as voice data, retinal scan data, or finger print data may be associated with a particular configuration. When a player subsequently provides biometric data to a gaming device 120, the gaming device 120 may look up the data in the configuration database to determine the player's preferred configuration.

A preparation code may take the form of a bar code, or any other machine-readable code. The player may then print out the bar code from his user terminal 106. When the player subsequently inserts the bar code into a gaming device 120, the gaming device may obtain the player's customized configuration.

In some embodiments, a player may specify his own code to be associated with a particular configuration. For example, a player may label a configuration using easy to remember terms such as "samurai," or "Big Jackpot," or "xyz," In some embodiments, a preparation code may only describe particular features that a player has selected. Other features may then take on default values. For example, if a player has only selected the number of reels, a code might read "NR5," where "NR" stands for "number of reels," and "5" indicates the desired number. Since the code does not describe other features, these may take on default values.

(iii) Transmit the Configuration Data and Preparation Code to a Casino Server

Once a preparation code has been associated with a particular configuration, the code and the configuration data may be transmitted to a casino server 112, and/or a gaming device 120. Transmission may occur via the Internet, email, phone, fax, or any other mode of communication. In some embodiments, the code and preparation data are transmitted immediately after they have been generated. In other embodiments, a gaming device 120 may only receive configuration data after a player has entered a code, and the gaming device 120 has sent the code to the casino server 112 and/or the central controller 102.

In embodiments where a preparation code contains information about a gaming device configuration, the central controller 102 need not necessarily transmit both configuration data and the preparation code, since a gaming device 120 or casino server 112 may be able to derive one from the other according to predefined rules.

(iv) Receive the Preparation Code at the Casino Server from a Gaming Device

Next, the system waits for a configuration request from a player. When a player sits down at a gaming device 120, he may enter his preparation code in order to have the gaming device assume the player's preferred features. The player may enter the code in a number of ways including: keying in the code via a keypad or touch screen, speaking the code into a microphone, whereby it is interpreted using voice recognition software, inserting a bar code into the gaming device 120, inserting into the gaming device 120 a magnetic strip containing the code, inserting into the gaming device 120 a floppy disc, CD, DVD or other storage medium containing the code, and/or wirelessly transmitting the code to the gaming device 120 using player device 512 such as a cell phone, PDA, two-way pager, or other communications device.

If the gaming device 120 cannot interpret the code, the gaming device 120 may transmit the code to the casino server 112 and/or to the central controller 102. The casino server 112 or central controller 103 may then look up the code in a preparation code database 208 such as that depicted in FIG. 8, and may retrieve the corresponding configuration information.

(v) Configure the Gaining Device Based on the Configuration Data Corresponding to the Preparation Code The configuration data retrieved from the casino server 112 and/or the central controller 102, is transmitted to the gaining device so that it can configure itself accordingly. In some embodiments described above, the gaming device 120 already has all the information it needs to self-configure upon initially receiving the preparation code from the player. Thus, in some embodiments, these final steps are not necessary to complete the methods of the present invention.

H. CONCLUSION

It is clear from the foregoing discussion that the disclosed systems and methods to facilitate planning and customization of a gaming experience represents an improvement in, among other things, the arts of electronic commerce and gaming. While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense.

Further, even though only certain embodiments have been described in detail, those having ordinary skill in the art will certainly appreciate and understand that many modifications, changes, and enhancements are possible without departing from the teachings thereof. All such modifications are intended to be encompassed within the following claims.

The invention is claimed as follows:

1. A gaming system server comprising:
at least one processor; and
at least one memory device which stores a plurality of instructions which, when executed by the at least one processor, cause the at least one processor to:
  (a) enable a player to log onto a gaming establishment website,
  (b) after the player is logged onto the gaming establishment website, enable the player to place a wager on a play of a game, and
  (c) if the wager is placed on the play of the game:
    (i) determine a game outcome,
    (ii) cause a first display device to display the determined game outcome,
    (iii) determine an award amount associated with the displayed game outcome,
    (iv) cause the first display device to display the determined award amount associated with the displayed game outcome, and
    (v) if the displayed award amount associated with the displayed game outcome is at least equal to a designated award amount, cause a message associated with the displayed award amount to be published, said publication occurring separate from the gaming establishment website and occurring distinct from any display of the designated award amount to the player.

2. The gaming system server of claim 1, wherein when executed by the at least one processor, the plurality of instructions cause the at least one processor to cause the message to be published via at least one selected from the group consisting of: an e-mail, an instant message, a web page, and a phone call.

3. The gaming system server of claim 1, wherein the first display device includes a display device associated with at least selected from the group consisting of: a personal computer associated with the player, a laptop computer associated with the player, a handheld computer associated with the player, a cellular phone associated with the player, and a personal digital assistant associated with the player.

4. The gaming system server of claim 1, wherein when executed by the at least one processor, the plurality of instructions cause the at least one processor to cause a second display device to display the published message.

5. The gaming system server of claim 4, wherein:
  (i) the first display device includes a display device associated with at least selected from the group consisting of: a personal computer associated with the player, a laptop computer associated with the player, a handheld computer associated with the player, a cellular phone associated with the player, and a personal digital assistant associated with the player, and
  (ii) the second display device includes a display device associated with at least selected from the group consisting of: a personal computer not associated with the player, a laptop computer not associated with the player, a handheld computer not associated with the player, a cellular phone not associated with the player, and a personal digital assistant not associated with the player.

6. The gaming system server of claim 1, wherein at least one of: (i) any wager placed on the play of the game, and (ii) the determined award amount, is selected from the group consisting of: a quantity of monetary credits and a quantity of non-monetary credits.

7. A gaming system server comprising:
at least one processor; and
at least one memory device which stores a plurality of instructions which when executed by the at least one processor, cause the at least one processor to:
  (a) enable a player to log onto a gaming establishment website,
  (b) after the player is logged onto the gaming establishment website, enable the player to place at least one wager on at least one play of a game, and
  (c) for each wager placed on each play of the game:
    (i) determine a game outcome,
    (ii) cause a first display device to display the determined game outcome,
    (iii) determine any award associated with the displayed game outcome,
    (iv) cause the first display device to display any determined award associated with the displayed game outcome,
  (d) if at least one of any wager placed, any displayed game outcomes and any determined awards cause a game play publication triggering event to occur, cause a message associated with said at least one of any wager placed, any displayed game outcomes and any determined awards to be published, said publication occurring separate from the gaming establishment website and occurring distinct from any display of the designated award amount to the player.

8. The gaming system server of claim 7, wherein the game play publication triggering event occurs based on at least one of: a plurality of determined game outcomes for a plurality of plays of the game and a plurality of any determined awards for a plurality of plays of the game.

9. The gaming system server of claim 7, wherein when executed by the at least one processor, the plurality of instructions cause the at least one processor to cause the message to be published via at least one selected from the group consisting of: an e-mail, an instant message, a web page, and a phone call.

10. The gaming system server of claim 7, wherein the first display device includes a display device associated with at least selected from the group consisting of: a personal computer associated with the player, a laptop computer associated with the player, a handheld computer associated with the player, a cellular phone associated with the player, and a personal digital assistant associated with the player.

11. The gaming system server of claim 7, wherein when executed by the at least one processor, the plurality of instructions cause the at least one processor to cause a second display device to display the published message associated with the displayed award amount.

12. The gaming system server of claim 11, wherein:
(i) the first display device includes a display device associated with at least selected from the group consisting of: a personal computer associated with the player, a laptop computer associated with the player, a handheld computer associated with the player, a cellular phone associated with the player, and a personal digital assistant associated with the player, and
(ii) the second display device includes a display device associated with at least selected from the group consisting of: a personal computer not associated with the player, a laptop computer not associated with the player, a handheld computer not associated with the player, a cellular phone not associated with the player, and a personal digital assistant not associated with the player.

13. The gaming system server of claim 7, wherein at least one of: (i) any wagers placed on any plays of the game, and (ii) any determined awards, is selected from the group consisting of: a quantity of monetary credits and a quantity of non-monetary credits.

14. A gaming system server comprising:
at least one processor; and
at least one memory device which stores a plurality of instructions which, when executed by the at least one processor, cause the at least one processor to:
(a) enable a player to log onto a gaming establishment website,
(b) after the player is logged onto the gaming establishment website:
(i) enable the player to identify a group of at least one friend to contact, and
(ii) enable the player to place a wager on a play of a game, and
(c) if the wager is placed on the play of the game:
(i) determine a game outcome,
(ii) cause a first display device to display the determined game outcome,
(iii) determine an award amount associated with the displayed game outcome,
(iv) cause the first display device to display the determined award amount associated with the displayed game outcome, and
(v) if the displayed award amount associated with the displayed game outcome is at least equal to a designated award amount, cause a message associated with the displayed award amount to be published to the identified group of at least one friend, said publication occurring separate from the gaming establishment website.

15. The gaming system server of claim 14, wherein when executed by the at least one processor, the plurality of instructions cause the at least one processor to cause the message to be published via at least one selected from the group consisting of: an e-mail, an instant message, a web page, and a phone call.

16. A gaming system server comprising:
at least one processor; and
at least one memory device which stores a plurality of instructions which when executed by the at least one processor, cause the at least one processor to:
(a) enable a player to log onto a gaming establishment website,
(b) after the player is logged onto the gaming establishment website:
(i) enable the player to identify a group of at least one friend to contact, and
(ii) enable the player to place at least one wager on at least one play of a game, and
(c) for each wager placed on each play of the game:
(i) determine a game outcome,
(ii) cause a first display device to display the determined game outcome,
(iii) determine any award associated with the displayed game outcome,
(iv) cause the first display device to display any determined award associated with the displayed game outcome,
(d) if at least one of any wager placed, any displayed game outcomes and any determined awards cause a game play publication triggering event to occur, cause a message associated with said at least one of any wager placed, any displayed game outcomes and any determined awards to be published to the identified group of at least one friend, said publication occurring separate from the gaming establishment website.

17. The gaming system server of claim 16, wherein when executed by the at least one processor, the plurality of instructions cause the at least one processor to cause the message to be published via at least one selected from the group consisting of: an e-mail, an instant message, a web page, and a phone call.

* * * * *

UNITED STATES PATENT AND TRADEMARK OFFICE
CERTIFICATE OF CORRECTION

PATENT NO. : 8,992,329 B2  
APPLICATION NO. : 13/951732  
DATED : March 31, 2015  
INVENTOR(S) : Jay S. Walker et al.

Page 1 of 1

It is certified that error appears in the above-identified patent and that said Letters Patent is hereby corrected as shown below:

IN THE CLAIMS

In Claim 3, Column 56, Line 17, between "least" and "selected" insert --one--.
In Claim 5, Column 56, Line 28, between "least" and "selected" insert --one--.
In Claim 5, Column 56, Line 35, between "least" and "selected" insert --one--.
In Claim 7, Column 56, Line 55, delete "and".
In Claim 7, Column 56, Line 61, after ",", insert --and--.
In Claim 7, Column 56, Line 64, after ",", insert --and--.
In Claim 10, Column 57, Line 21, between "least" and "selected" insert --one--.
In Claim 12, Column 57, Line 33, between "least" and "selected" insert --one--.
In Claim 12, Column 57, Line 40, between "least" and "selected" insert --one--.
In Claim 16, Column 58, Line 36, delete "and".
In Claim 16, Column 58, Line 42, after ",", insert --and--.
In Claim 16, Column 58, Line 45, after ",", insert --and--.

Signed and Sealed this  
Sixth Day of October, 2015

Michelle K. Lee  
*Director of the United States Patent and Trademark Office*